(12) United States Patent
Huang et al.

(10) Patent No.: US 11,770,771 B2
(45) Date of Patent: *Sep. 26, 2023

(54) COMMUNICATION APPARATUS AND COMMUNICATION METHOD

(71) Applicant: Panasonic Intellectual Property Corporation of America, Torrance, CA (US)

(72) Inventors: Lei Huang, Singapore (SG); Yoshio Urabe, Nara (JP); Rojan Chitrakar, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/730,024

(22) Filed: Apr. 26, 2022

(65) Prior Publication Data

US 2022/0256459 A1 Aug. 11, 2022

Related U.S. Application Data

(63) Continuation of application No. 17/044,525, filed as application No. PCT/JP2019/014144 on Mar. 29, 2019, now Pat. No. 11,350,366.

(30) Foreign Application Priority Data

Apr. 16, 2018 (JP) .................................. 2018-078232

(51) Int. Cl.
*H04W 52/02* (2009.01)
*H04W 76/11* (2018.01)
(Continued)

(52) U.S. Cl.
CPC ....... *H04W 52/0229* (2013.01); *H04L 1/1614* (2013.01); *H04W 52/0216* (2013.01); *H04W 76/11* (2018.02); *H04W 84/12* (2013.01)

(58) Field of Classification Search
CPC ... H04W 76/11; H04W 84/12; H04W 52/019; H04W 52/0225
See application file for complete search history.

(56) References Cited

U.S. PATENT DOCUMENTS 11,350,366 B2 * 5/2022 Huang ............. H04W 52/0219
2010/0150043 A1 6/2010 Kim et al.
(Continued)

FOREIGN PATENT DOCUMENTS

WO WO 2018062905 A1 4/2018

OTHER PUBLICATIONS

Indian Office Action, dated Jul. 19, 2022, for Indian Patent Application No. 202047042717, (6 pages).
(Continued)

*Primary Examiner* — Mohammad S Anwar
(74) *Attorney, Agent, or Firm* — Seed IP Law Group LLP

(57) ABSTRACT

A transmission apparatus of the present disclosure comprises a signal generator which, in operation, generates a transmission signal that comprises a data field containing a WUR (Wake Up Radio) Mode Setup frame; wherein a field of a WUR Mode element included in the WUR Mode Setup frame contains the information on Group IDs (Identifiers) assigned by an AP (Access Point) to the station comprising the transmission apparatus; and a transmitter which, in operation, transmits the generated transmission signal.

17 Claims, 31 Drawing Sheets

(51) Int. Cl.
*H04L 1/1607* (2023.01)
*H04W 84/12* (2009.01)

(56) References Cited

U.S. PATENT DOCUMENTS

| | | |
|---|---|---|
| 2013/0214900 A1 | 8/2013 | Mitchell |
| 2018/0077641 A1 | 3/2018 | Yang |
| 2018/0184379 A1 | 6/2018 | Liu et al. |
| 2018/0359704 A1 | 12/2018 | Li et al. |
| 2019/0261273 A1 | 8/2019 | Kim et al. |

OTHER PUBLICATIONS

Extended European Search Report dated May 11, 2021, for the corresponding European Patent Application No. 19787956.2, 9 pages.

IEEE Computer Society, "Part 11: Wireless LAN Medium Access Control (MAC) and Physical Layer (PHY) Specifications, Amendment 9: Wake-Up Radio Operation," IEEE P802.11ba/D0.1, Jan. 2018, 54 pages.

IEEE Computer Society, "Part 11: Wireless LAN Medium Access Control (MAC) and Physical Layer (PHY) Specifications, Amendment 9: Wake-Up Radio Operation," IEEE P802.11ba/D0.3, May 2018, 70 pages.

International Search Report, dated Jun. 4, 2019, for corresponding International Application No. PCT/JP2019/014144, 2 pages.

Lei Huang et al., "Discussion on Group ID Structure," IEEE 802.11-18/0472r3, Mar. 8, 2018, 7 pages.

Po-Kai Huang, "Specification Framework for TGba," IEEE 802.11-15/0132r1511, Mar. 26, 2018, 18 pages.

Po-Kai Huang, "Specification Framework for TGba," IEEE 802.11-17/0575r11, Mar. 26, 2018, 18 pages.

Po-Kai Huang, Intel, "Proposed Text for WUR MAC Revision," LB2051, 802.11ba Draft Specification, Jul. 2018, 14 pages.

* cited by examiner

| Action Type field value | Meaning |
|---|---|
| 0 | Enter WUR Mode Request |
| 1 | Enter WUR Mode Response |
| 2 | Enter WUR Mode Suspend Request |
| 3 | Enter WUR Mode Suspend Response |
| 4 | Enter WUR Mode Suspend |
| 5 | Enter WUR Mode |
| 6 | Update WUR Parameters |

Fig. 7

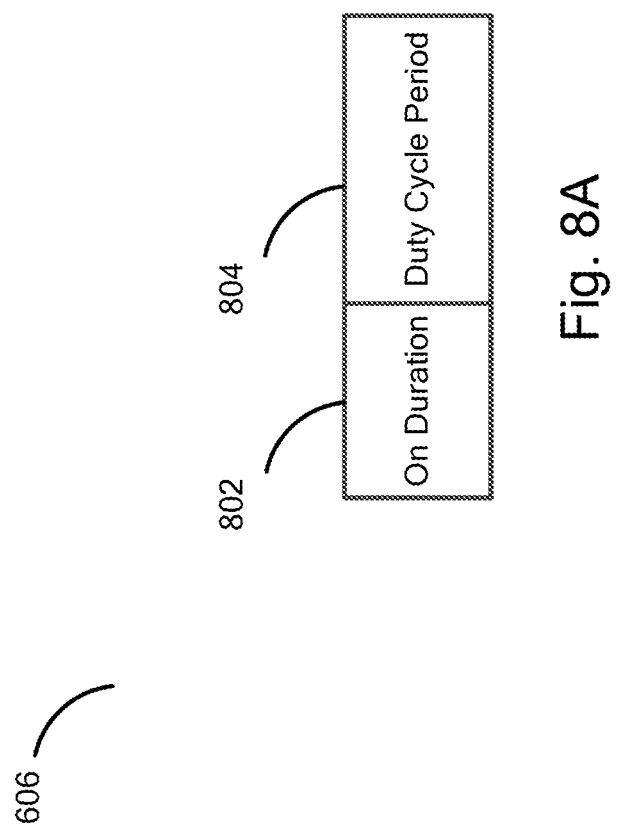

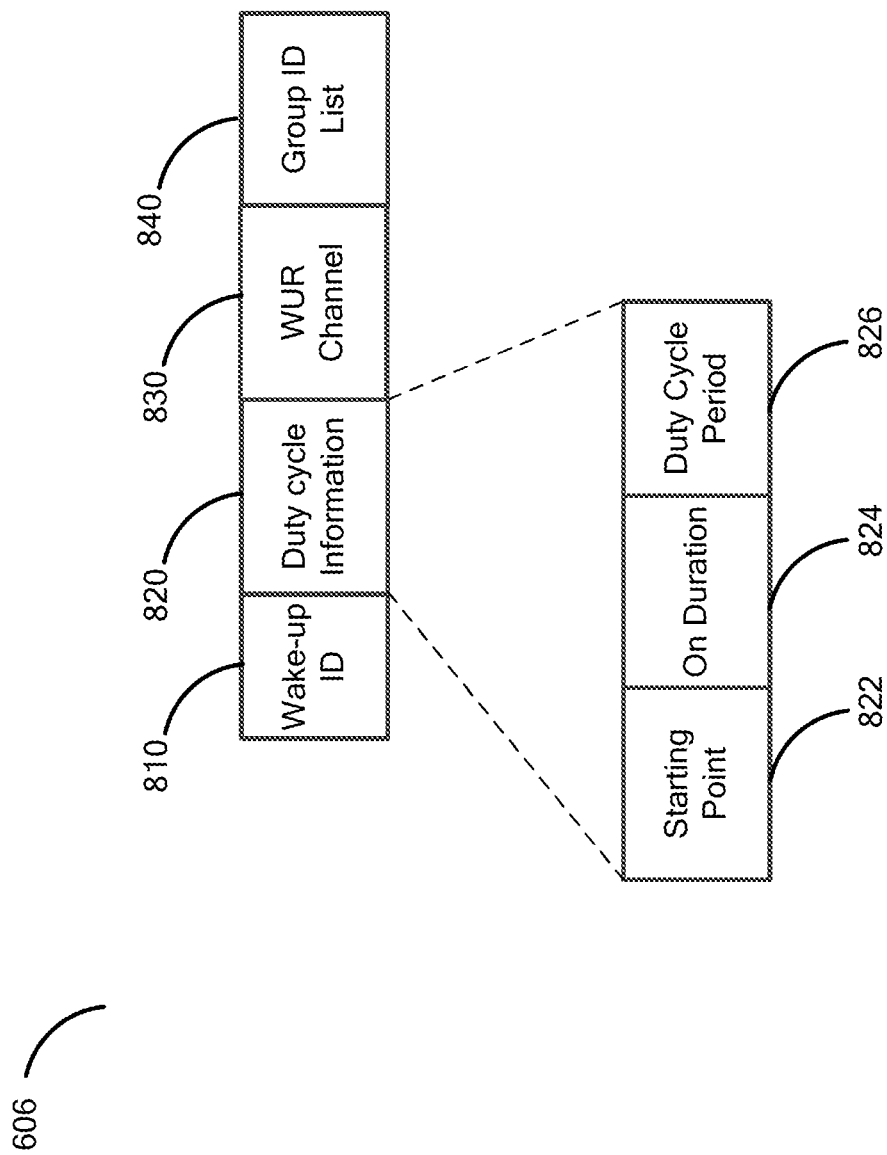

| Type | Type description |
|---|---|
| 0 | WUR Beacon |
| 1 | WUR Wake Up |
| 2 | WUR Vendor Specific |

Fig. 12

| WUR frame type | Address field |
|---|---|
| Unicast WUR Wake Up | Wake Up ID |
| Multicast WUR Wake Up | Group ID |
| Broadcast WUR Wake Up or WUR Beacon | Transmit ID |
| WUR Vendor Specific | OUI1 |

Fig. 13

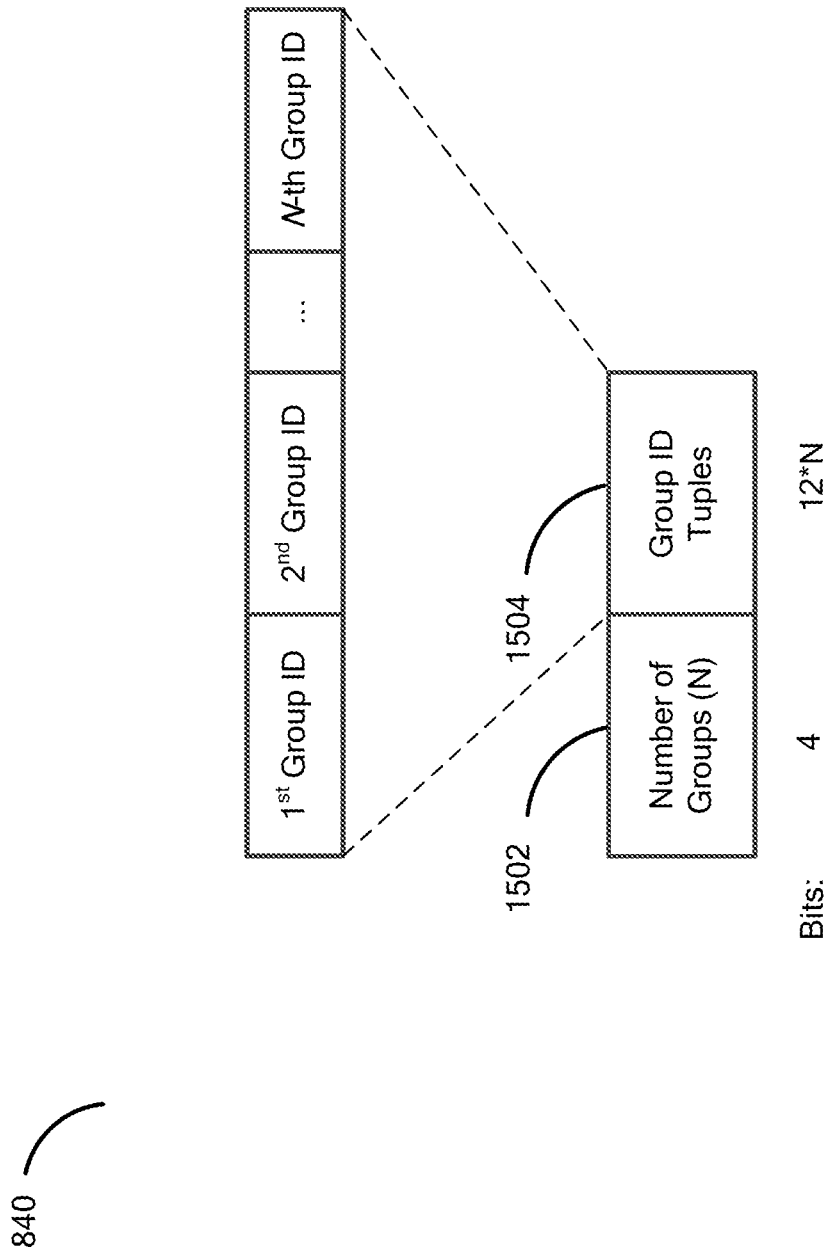

COMMUNICATION APPARATUS AND COMMUNICATION METHOD

TECHNICAL FIELD

The present disclosure is generally related to a communication apparatus and a communication method.

BACKGROUND ART

The IEEE (Institute of Electrical and Electronics Engineers) 802.11 Working Group is defining a PHY (physical) layer specification and modifications on MAC (Medium Access Control) layer specification that enable operation of a WUR (Wake Up Radio) apparatus. The WUR apparatus is a companion radio apparatus to a PCR (Primary Connectivity Radio) apparatus, e.g., IEEE 802.11a/g/n/ac/ax radio apparatus. The WUR apparatus comprises a WURx (Wake Up Receiver) which is capable of receiving WUR frames. The PCR apparatus included in a wireless communication device is used for user data communication with the access point (AP) with which the device is associated; while the WUR apparatus included in the device is not used for user data communication. For a wireless communication device operating in WUR Mode, when the PCR apparatus of the device is in the doze state, the WURx of the device follows the duty cycle schedules negotiated between the device and the AP. Once the WURx of the device receives WUR Wake-up frame, the PCR apparatus of the device transits to the awake state.

CITATION LIST

Non Patent Literature

[NPL 1]
IEEE 802.11-17/0575r11, Specification Framework for TGba, March 2018

SUMMARY OF INVENTION

Studies are underway on how a wireless communication device is able to perform WUR mode operation in an efficient manner.

One non-limiting and exemplary embodiment of the present disclosure facilitates performing WUR mode operation in an efficient manner.

In one general aspect, the techniques disclosed here feature: a transmission apparatus comprises a signal generator which, in operation, generates a transmission signal that comprises a data field containing a WUR Mode Setup frame; wherein a field of a WUR Mode element included in the WUR Mode Setup frame contains the information on group IDs (Identifiers) assigned by an AP to the station comprising the transmission apparatus; and a transmitter which, in operation, transmits the generated transmission signal.

It should be noted that general or specific embodiments may be implemented as a system, a method, an integrated circuit, a computer program, a storage medium, or any selective combination thereof.

By taking advantage of the communication apparatus and the communication method described in the present disclosure, a wireless communication device is able to perform WUR mode operation in an efficient manner.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 7 is a diagram illustrating an example definition of the Action Type field of the WUR Mode element according to the present disclosure.

FIG. 8A is a diagram illustrating an example format of the WUR Parameters field of the WUR Mode element transmitted by WUR STA according to the present disclosure.

FIG. 8B is a diagram illustrating an example format of the WUR Parameters field of the WUR Mode element transmitted by AP according to the present disclosure.

FIG. 12 is a diagram illustrating an example definition of the Type field of the WUR frame according to the present disclosure.

FIG. 13 is a diagram illustrating an example definition of the Address field of the WUR frame according to the present disclosure.

FIG. 15 is a diagram illustrating an example format of the Group ID List field according to a first embodiment of the present disclosure.

DESCRIPTION OF EMBODIMENTS

The present disclosure can be better understood with the aid of following figures and embodiments. The embodiments described here are merely exemplary in nature and are used to describe some of the possible applications and uses of the present disclosure and should not be taken as limiting the present disclosure with regard to alternative embodiments that are not explicitely described herein.

In any wireless communication system, a wide variety of devices may be a part of the wireless network, each device differing in terms of traffic needs, device capabilities, power supply types and so on. Some class of devices may have less bandwidth requirements and also less stringent QoS (Quality of Service) requirements but may be relatively more concerned about power consumption (e.g., mobile phones). Another class of devices may have low bandwidth requirements as well as very low duty cycles but may be very sensitive to power consumption due to extremely small batteries or extremely long life expectancy (e.g., sensors for remote sensing).

In many wireless communication systems, there will be one or more central controllers which will determine the wireless network coverage area, the wireless frequency channels, the device admission policy, coordination with other neighboring wireless networks etc. and usually also act as a gateway to the backend infrastructure network. Examples of the central controllers are base stations or eNBs in cellular wireless networks or APs in WLANs (Wireless Local Area Networks).

Even though the techniques described in the present disclosure may apply to many wireless communication systems, for the sake of example, the rest of the descriptions in this disclosure are described in terms of an IEEE 802.11 based WLAN system and its associated terminologies. This should not be taken as limiting the present disclosure with regard to alternative wireless communication systems. In IEEE 802.11 based WLANs, majority of networks operate in infrastructure mode, i.e., all or most of the traffic in the network need to go through the AP. As such, any STA (station) wishing to join the WLAN must first negotiate the network membership with the AP through a process called association and authentication.

Figure 1:
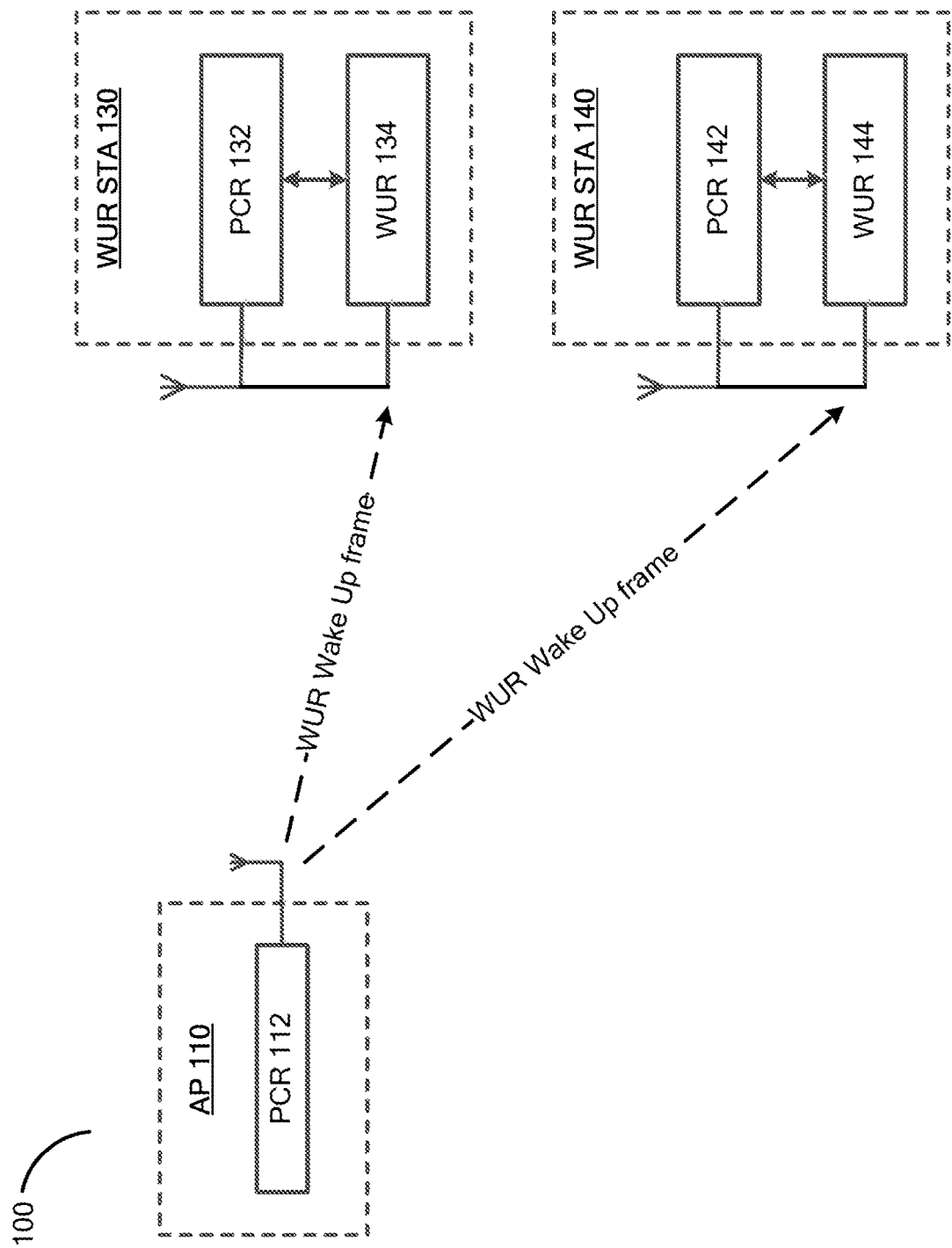
FIG. 1 is a diagram illustrating an example wireless network.

FIG. 1 illustrates an example wireless network 100 including an AP 110 and a plurality of STAs associated with the AP 110. The plurality of STAs form a BSS (Basic Service Set) of the AP 110. The AP 110 includes a PCR apparatus (hereinafter stated simply as "PCR") 112. The STA 130 represents a device class that may have less bandwidth requirements and also less stringent QoS requirements but may be relatively more concerned about power consumption. The STA 140 represents another class of devices that may have low bandwidth requirements but may be very sensitive to power consumption. In order to maximise energy efficiency, the STA 130 is equipped with a WUR apparatus 134 (hereinafter stated simply as "WUR") in addition to a PCR 132 and the STA 140 is equipped with a WUR 144 in addition to a PCR 142. Both the STA 130 and the STA 140 are termed as WUR STAs thereafter.

According to the present disclosure, the PCR of a WUR STA can operate in either of the two power management modes: active mode and PS (power save) mode. For the PCR of a WUR STA operating in PS mode, it is in the awake state when it is able to receive DL (downlink) traffic or transmit UL (uplink) traffic; and it is in the doze state when it is not able to receive DL traffic and transmit UL traffic. For the PCR of a WUR STA operating in active mode, it is always in the awake state.

According to the present disclosure, the WUR of a WUR STA comprises a WURx which is capable of receiving WUR frames. The WURx of a WUR STA can be in either of the two states: WURx Awake or WURx Doze. The WURx of a WUR STA is in the WURx Awake state when it is able to receive WUR frames. The WURx of a WUR STA is in the WURx Doze state when it is not able to receive WUR frames.

According to the present disclosure, a WUR STA can operate in WUR Mode Suspend or WUR Mode. When a WUR STA operates in WUR Mode, its WURx shall be in the WURx Awake state during the on durations of WUR duty cycle schedules negotiated between the AP 110 and the WUR STA if the PCR of the WUR STA is in the doze state; and its WURx may be in the WURx Doze state after the WUR STA uses its PCR to complete a successful frame exchange with the AP 110, which informs the AP 110 that the PCR of the WUR STA is the awake state. When a WUR STA operates in WUR Mode Suspend, its WURx may be in the WURx Doze state; and the WUR parameters negotiated between the AP 110 and the WUR STA are maintained by the WUR STA and the AP 110.

Figure 2:
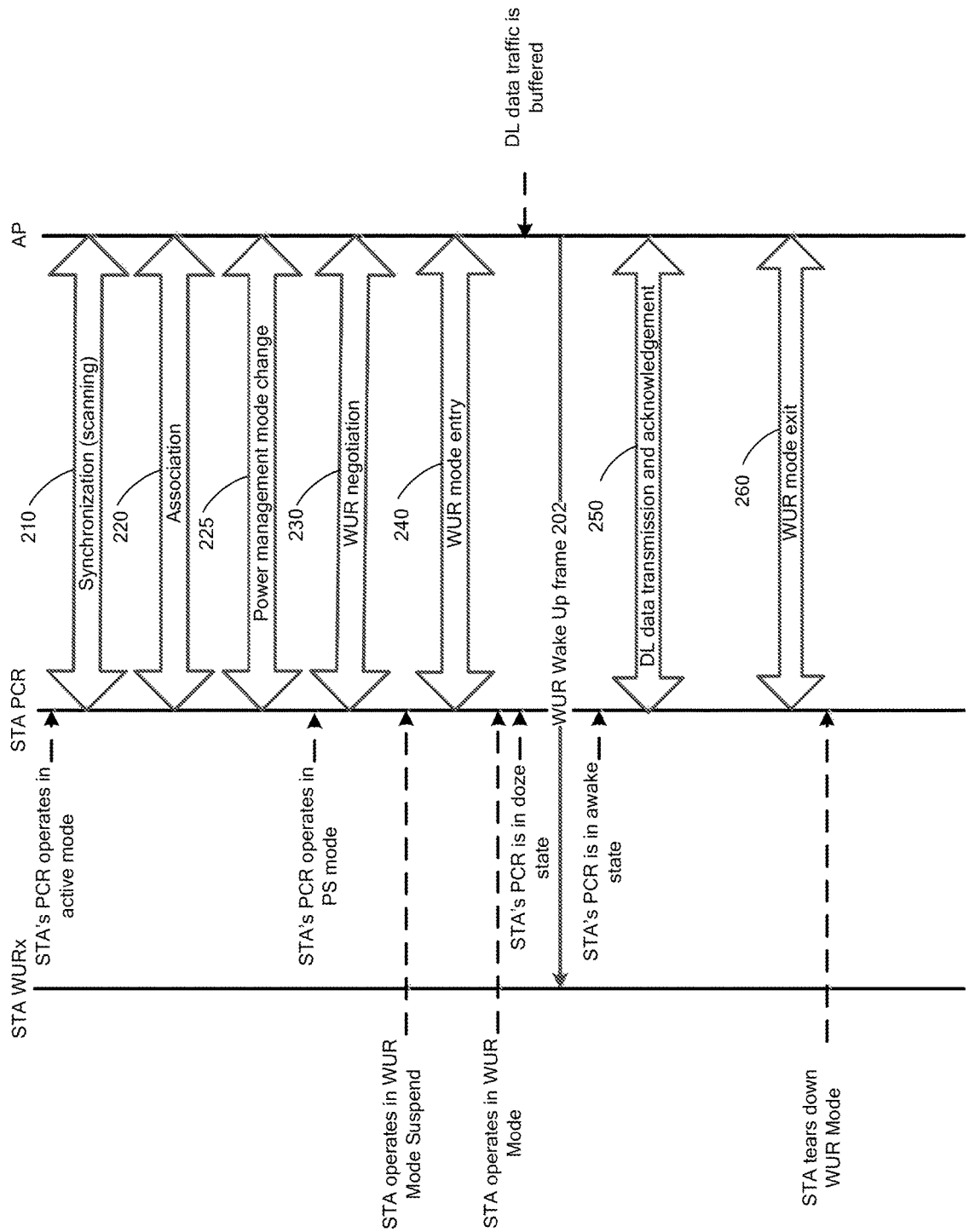
FIG. 2 is a diagram illustrating example WUR mode operation related MAC procedures according to the present disclosure.

FIG. 2 illustrates example WUR mode operation related MAC procedures operated by a WUR STA and the AP 110 according to the present disclosure. Before the WUR STA is associated with the AP 110, its PCR is in active mode. The STA initiates a synchronization procedure 210 to acquire synchronization with the AP 110 via passive or active scanning. During the synchronization procedure 210, if active scanning is performed, the STA sends a Probe Request frame to the AP 110 via its PCR. The Probe Request frame includes a WUR Capabilities element (see FIG. 3A) advertising WUR capabilities of the STA. The AP 110 responds with a Probe Response frame. The Probe Response frame includes a WUR Capabilities element advertising WUR capabilities of the AP 110 and a WUR Operation element (see FIG. 3B) announcing WUR parameters which are common to all WUR STAs. If passive scanning is performed, the STA receives a Beacon frame from the AP 110 via its PCR. The Beacon frame contains a WUR Capabilities element which advertises WUR capabilities of the AP 110 and a WUR Operation element announcing WUR parameters which are common to all WUR STAs. The formats of the Probe Request, Probe Response and Beacon frames are defined in the IEEE Std 802.11™-2016.

Figure 3A:
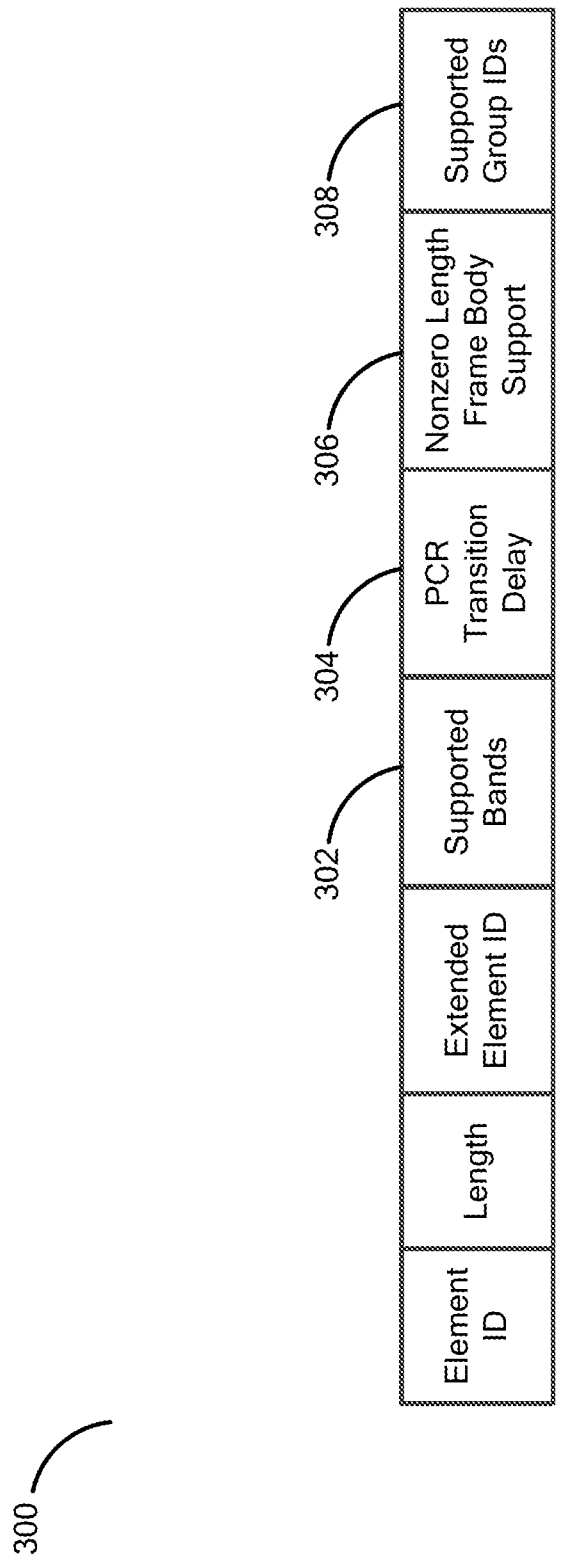
FIG. 3A is a diagram illustrating an example format of the WUR Capabilities element according to the present disclosure.

FIG. 3A illustrates an example format of the WUR Capabilities element 300 according to the present disclosure. The WUR Capabilities element 300 indicates WUR capabilities of the WUR STA or the AP 110 transmitting the element 300 and comprises a Supported Bands field 302, a PCR Transition Delay field 304, a Nonzero Length Frame Body Support field 306 and a Supported Group IDs field 308. The Supported Bands field 302 indicates supported bands for WUR mode operation. The PCR Transition Delay field 304 indicates PCR transition delay from the doze state to the awake state of the WUR STA transmitting the element 300 after receiving WUR Wake-up frame. The Nonzero Length Frame Body Support field 306 indicates supportability of non-zero length frame body of WUR frame (see FIG. 11). The Supported Group IDs field 308 indicates the group ID bitmap size that the WUR STA transmitting the element 300 is capable of storing. The group ID bitmap size (i.e., number of bits in the group ID bitmap) that the WUR STA is capable of storing shall not be larger than the number of group IDs that can be provided by the AP 110. For example, if 64 group IDs can be provided by the AP 110, the group ID bitmap size that the WUR STA is capable of storing can be 8 bits, 16 bits, 32 bits or 64 bits. In this case, the Supported Group IDs field 308 may have a size of 3 bits. The Supported Group IDs field 308 is set to 0 to indicate that the WUR STA does not support the reception of group ID based multicast WUR Wake-up frames. The Supported Group IDs field 308 is set to 1, 2, 3 and 4 to indicate that the WUR STA is capable of storing 8-bit, 16-bit, 32-bit and 64-bit group ID bitmap, respectively. The Supported Bands field 302, the PCR Transition Delay field 304, the Nonzero Length Frame Body Support field 306 and the Supported Group IDs field 308 are reserved when the element 300 is transmitted by the AP 110.

Figure 3B:
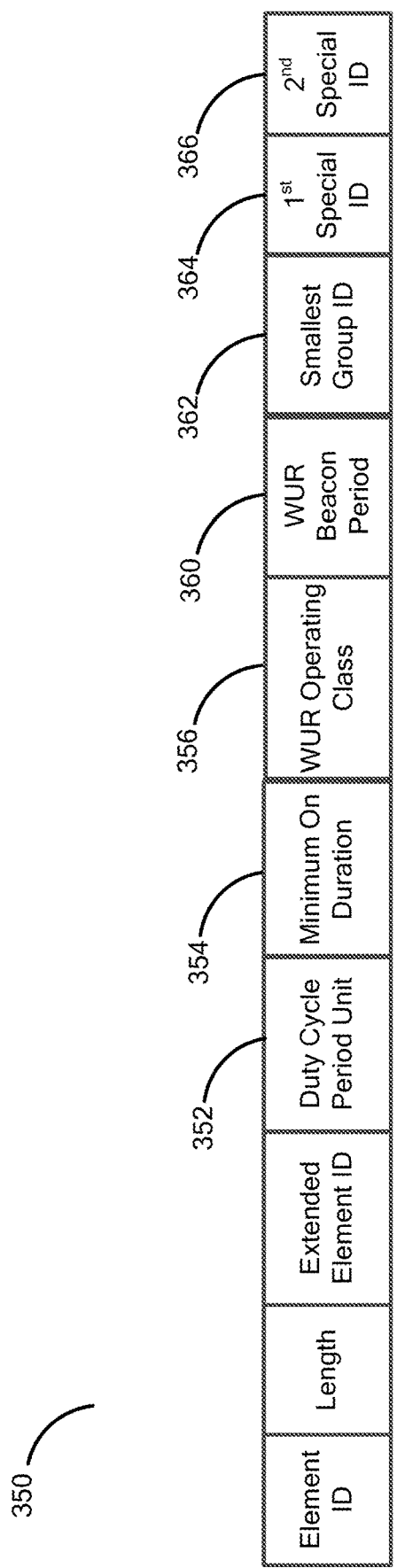
FIG. 3B is a diagram illustrating an example format of the WUR Operation element according to the present disclosure.

FIG. 3B illustrates an example format of the WUR Operation element 350 according to the present disclosure. The WUR Operation element 350 contains WUR parameters which are controlled by an AP and are common to all WUR STAs in the BSS of the AP. The WUR Operation element 350 comprises a Duty Cycle Period Unit field 352, a Minimum On Duration field 354, a WUR Operating Class field 356 and a WUR Beacon Period field 360. The Duty Cycle Period Unit field 352 indicates the basic unit of the period of the WUR duty cycle operation, which is a multiple of time unit (1024 us) defined in the IEEE Std 802.11™-2016 for easy of implementation. The Minimum On Duration field 354 indicates a minimum value of the on duration of a WUR duty cycle schedule, which is a multiple of time unit (1024 us) defined in the IEEE Std 802.11™-2016 for easy of implementation. The WUR Operating Class field 356 indicates the operating class in use for transmission of WUR frame from the AP 110 to the associated WUR STAs. The WUR Beacon Period field 360 indicates the period of WUR Beacon frame.

After the WUR STA gets synchronized with the AP 110 via the synchronization procedure 220, it may initiate an association procedure 220 with the AP 110. During the association procedure 220, the STA sends an Association Request frame or a Reassociation Request frame to the AP 110, which includes a WUR Capabilities element for advertising WUR capabilities of the STA. The AP 110 responds with an Association Response frame or a Reassociation Response frame, which includes a WUR Capabilities element for advertising WUR capabilities of the AP 110 and a WUR Operation element for announcing WUR parameters which are common to all WUR STAs. The formats of the Association Request, Association Response, Reassociation Request and Reassociation Response frames are defined in the IEEE Std 802.11™-2016.

The STA may initiate a power management mode change procedure 225 for changing its PCR's power management mode to PS mode after it is associated with the AP 110 via the association procedure 220 with the AP 110. During the power management mode change procedure 225, the STA may transmit a QoS Null frame via its PCR with the Power Management subfield set to 1 to the AP 110; and the AP 110 will respond with an Ack frame. After receiving the Ack frame, the STA's PCR transits to operate in PS mode. After that, the STA may initiate a WUR negotiation procedure 230 with the AP 110 to negotiate user-specific WUR parameters. The formats of the QoS Null and Ack frames are defined in the IEEE Std 802.11™-2016.

Figure 4:
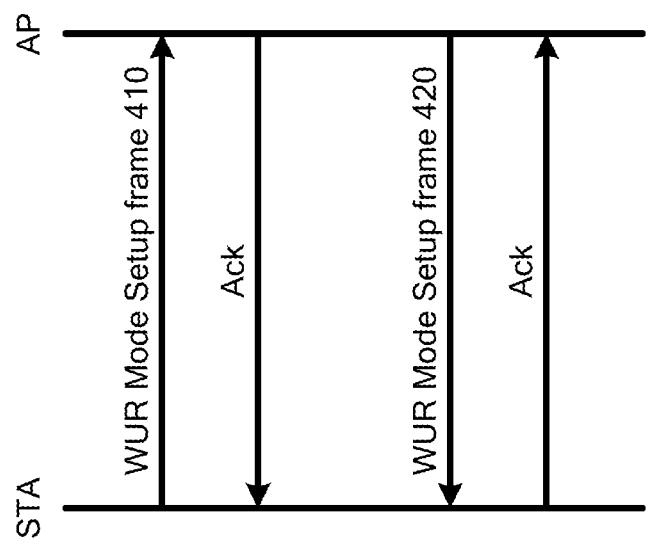
FIG. 4 is a diagram illustrating an example WUR negotiation procedure according to the present disclosure.

FIG. 4 illustrates an example WUR negotiation procedure according to the present disclosure. The WUR STA transmits a WUR Mode Setup frame 410 (see FIG. 5) via its PCR to the AP 110. The WUR Mode Setup frame 410 comprises a WUR Mode element (see FIG. 6) in which the Action Type field is set to "Enter WUR Mode Suspend Request" (see FIG. 7) and the WUR Parameters field (see FIG. 8A) contains the WUR parameters preferred by the STA. The AP 110 responds with an Ack frame upon succesful receipt of the WUR Mode Setup frame 410. After that, the AP 110 transmits a WUR Mode Setup frame 420 to the STA. The WUR Mode Setup frame 420 comprises a WUR Mode element in which the Action Type field is set to "Enter WUR Mode Suspend Response" and the WUR Mode Response Status field is set to "Accept" or "Denied". If the WUR Mode Response Status field of the WUR Mode element in the WUR Mode Setup frame 420 is set to "Accept", the WUR Parameters field of the same WUR Mode element (see FIG. 8B) contains WUR parameters determined by the AP 110. If the WUR Mode Response Status field sets to "Denied", the WUR Parameters field is not present. The STA responds with an Ack frame via its PCR upon succesful receipt of the WUR Mode Setup frame 420.

Figure 9:
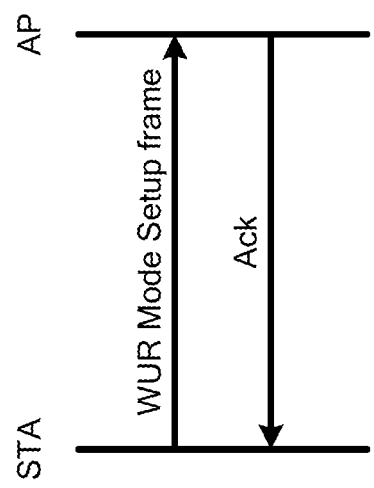
FIG. 9 is a diagram illustrating an example WUR mode entry procedure according to the present disclosure.

If the WUR negotiation procedure 230 is successfully completed (i.e., the WUR Mode Response Status field of the WUR Mode element in the WUR Mode Setup frame 420 is set to "Accept"), the WUR STA enters WUR Mode Suspend. Then the WUR STA may initiate a WUR mode entry procedure 240 with the AP 110 to switch to WUR Mode from WUR Mode Suspend for better power save. FIG. 9 illustrates an example WUR mode entry procedure 240 according to the present disclosure. The WUR STA transmits a WUR Mode Setup frame via its PCR to the AP 110. The WUR Mode Setup frame comprises a WUR Mode element in which the Action Type field is set to "Enter WUR Mode" and the WUR Parameters field is not present. The AP 110 responds with an Ack frame upon succesful receipt of the WUR Mode Setup frame. After receiving the Ack frame, the STA operates in WUR Mode according to the WUR parameters negotiated between the AP 110 and the STA during the WUR negotiation procedure 230. In more details, the WURx of the STA operating in WUR Mode follows the duty cycle schedules negotiated between the AP 110 and the STA if the PCR of the STA is in the doze state.

Alternatively, instead of separate WUR negotiation procedure 230 and WUR mode entry procedure 240, the STA may initiate an integrated WUR negotiation and WUR mode entry procedure with the AP 110 for requesting to enter WUR Mode. During the integrated WUR negotiation and WUR mode entry procedure, the STA transmits a WUR Mode Setup frame via its PCR to the AP 110. The WUR Mode Setup frame comprises a WUR Mode element in which the Action Type field is set to "Enter WUR Mode Request" and the WUR Parameters field contains WUR parameters preferred by the STA. The AP 110 responds with an Ack frame upon succesful receipt of the WUR Mode Setup frame. After that, the AP 110 transmits a WUR Mode Setup frame to the STA. The WUR Mode Setup frame comprises a WUR Mode element in which the Action Type field is set to "Enter WUR Mode Response" and the WUR Mode Response Status field is set to "Accept" or "Denied". If the WUR Mode Response Status field is set to "Accept", the WUR Parameters field contains WUR parameters determined by the AP 110. If the WUR Mode Response Status field is set to "Denied", the WUR Parameters field is not present. The STA responds with an Ack frame via its PCR upon succesful receipt of the WUR Mode Setup frame.

According to the present disclosure, if the PCR of the WUR STA operating in WUR Mode is in the doze state, when its WURx receives WUR Wake-up frame from the AP 110, its PCR transits to the awake state as shown in FIG. 2, and then initiates a DL data transmission and acknowledgement procedure 250 with the AP 110. During the DL data transmission and acknowledgement procedure 250, it may transmit a PS-Poll frame to the AP 110 via its PCR to retrieve buffered traffic and acknowledge successful receipt of the WUR Wake-up frame. The AP 110 responds to the PS-Poll frame with a buffered QoS Data frame or an Ack frame followed in a separate TXOP (transmit opportunity) by a buffered QoS Data frame at the head of transmit queue. If there is more buffered traffic for the STA, the More Data field in the delivered QoS Data frame is set to 1. Otherwise, the More Data field in the delivered QoS Data frame is set to 0. The STA responds with an acknowledgement frame via its PCR for acknowledging successful receipt of the QoS Data frame. The acknoweldgement frame is either an Ack frame or a BlockAck frame. The formats of the QoS Data and BlockAck frames are defined in the IEEE Std 802.11™-2016.

Figure 10:
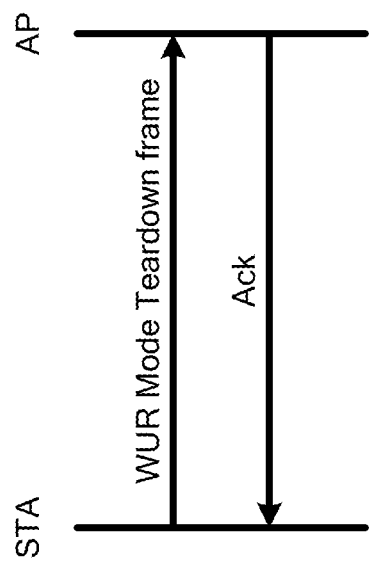
FIG. 10 is a diagram illustrating an example WUR exit procedure according to the present disclosure.

According to the present disclosure, when the WUR STA intends to tear down WUR Mode, it initiates a WUR mode exit procedure 260 with the AP 110. FIG. 10 illustrates an example WUR mode exit procedure 260 according to the present disclosure. The STA transmits a WUR Mode Teardown frame (see FIG. 5) via its PCR to the AP 110. The AP 110 responds with an Ack frame upon successful receipt of the WUR Mode Teardown frame. After receiving the Ack frame, the STA tears down WUR Mode.

(An Example Format of WUR Mode Setup or Teardown Frame)

Figure 5:
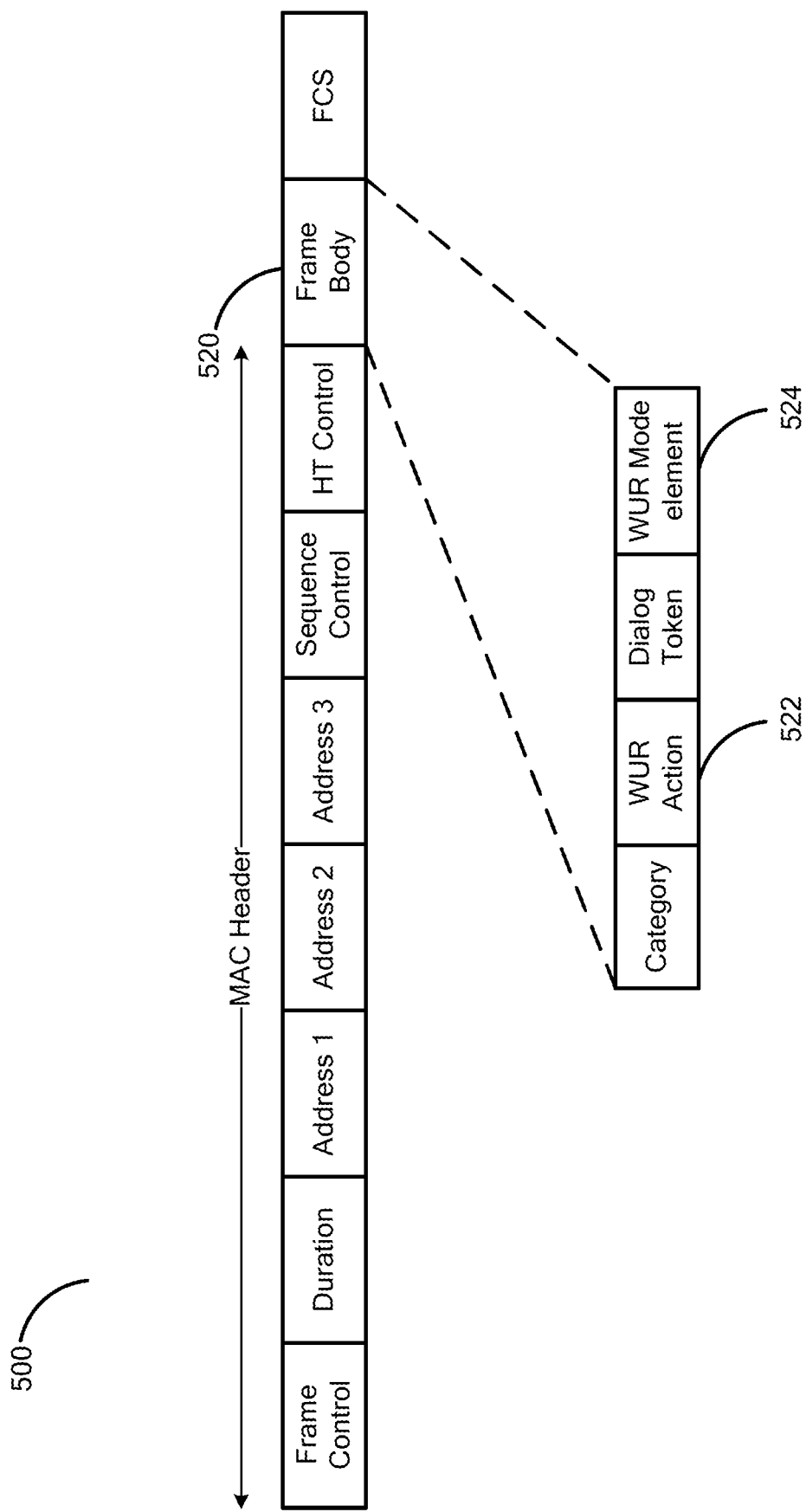
FIG. 5 is a diagram illustrating an example format of the WUR Mode Setup frame or WUR Mode Teardown frame according to the present disclosure.

FIG. 5 illustrates an example format of the WUR Mode Setup frame or WUR Mode Teardown frame 500 according to the present disclosure. The frame 500 comprises a Frame Body field 520. The frame 500 is a WUR Action frame and the WUR Action field 522 of the Frame Body field 520 indicates whether the frame 500 is WUR Mode Setup frame or WUR Mode Teardown frame. If the frame 500 is WUR Mode Setup frame, the Frame Body field 520 may comprise a WUR Mode element 524. Otherwise the WUR Mode element 524 is not present.

Figure 6:
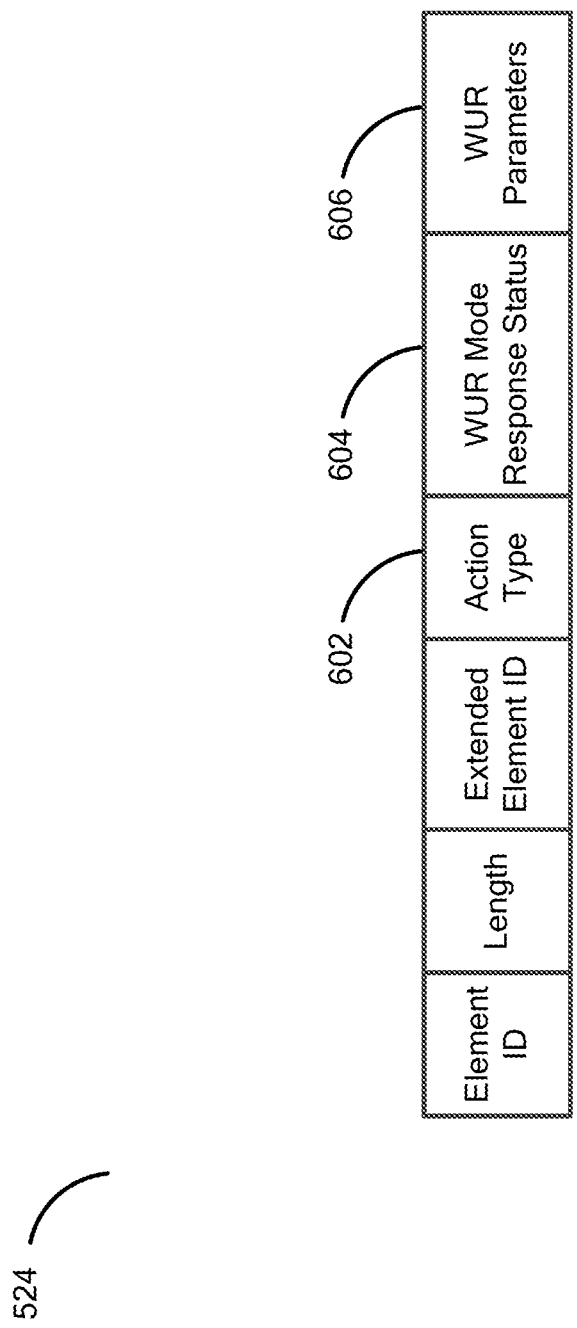
FIG. 6 is a diagram illustrating an example format of the WUR Mode element according to the present disclosure.

FIG. 6 illustrates an example format of the WUR Mode element 524 according to the present disclosure. The WUR Mode element 524 comprises an Action Type field 602 and a WUR Mode Response Status field 604. The WUR Mode element 524 may comprises a WUR Parameters field 606. The Action Type field 602 is defined in FIG. 7 and indicates the action taken by the WUR Mode Setup frame containing the WUR Mode element 524. The WUR Mode Response Status field 604 indicates whether the request for entering WUR Mode Suspend or WUR Mode is accepted or denied. The WUR Parameters field 606 contains user-specific WUR parameters either preferred by a WUR STA or determined by the AP 110.

FIG. 8A illustrates an example format of the WUR Parameters field 606 of the WUR Mode element 524 transmitted by a WUR STA according to the present disclosure. The WUR Parameters field 606 of the WUR Mode element 524 transmitted by the STA comprises an On Duration field 802 and a Duty Cycle Period field 804. The On Duration field 802 indicates the preferred on duration of each WUR duty cycle schedule, during which the STA's WURx will be in the WURx Awake state. The preferred on duration is a multiple of time unit (1024 us) defined in the IEEE Std 802.11™-2016 for easy of implementation and shall be larger than or equal to the minimum on duration indicated by the Minimum On Duration field 354 in the most recently received WUR Operation element 350 from the AP 110. The Duty Cycle Period field 804 indicates the preferred elapsed time between the start times of two successive WUR duty cycle schedules. The Duty Cycle Period field 804 is based on the unit indicated by the Duty Cycle Period Unit field 352 in the most recently received WUR Operation element 350 from the AP 110.

FIG. 8B illustrates an example format of the WUR Parameters field 606 of the WUR Mode element 524 transmitted by the AP 110 according to the present disclosure. The WUR Parameters field 606 of the WUR Mode element 524 transmitted by the AP 110 comprises a Wake-up ID (identifier) field 810, a Duty Cycle Information field 820, a WUR Channel field 830 and a Group ID List field 840. The Wake-up ID field 810 indicates the Wake-up ID assigned by the AP 110 to the intended WUR STA, which uniquely identifies the intended WUR STA in the BSS of the AP 110.

The Duty Cycle Information field 820 comprises a Starting Point field 822, a On Duration field 824 and a Duty Cycle Period field 826. The Starting Point field 822 indicates the TSF (Time Synchronization Function) time of the starting point of the intended STA's WUR duty cycle schedule. The On Duration field 824 indicates the determined on duration of each WUR duty cycle schedule, during which the intended STA's WURx will be in the WURx Awake state. The determined on duration is a multiple of time unit (1024 us) defined in the IEEE Std 802.11™-2016 for easy of implementation and shall be larger than or equal to the minimum on duration indicated by the Minimum On Duration field 354 in the most recently transmitted WUR Operation element 350. The Duty Cycle Period field 826 indicates the determined elapsed time between the start times of two successive WUR duty cycle schedules. The Duty Cycle Period field 826 is based on the unit indicated by the Duty Cycle Period Unit field 352 in the most recently transmitted WUR Operation element 350. Notice that for a WUR STA operating in WUR Mode, when the determined on duration is equal to the determined duty cycle period, its WURx is always in the WURx Awake state if its PCR is in the doze state.

The WUR Channel field 830 indicates the channel in use for transmission of WUR frame from the AP 110 to the intended WUR STA.

The Group ID List field 840 contains the information on group IDs assigned by the AP 110 to the intended WUR STA. A group ID uniquely identifies a group of WUR STAs in the BSS of the AP 110. The format of the Group ID List field 840 will be detailed later.

(An Example Format of WUR Frame)

Figure 11:
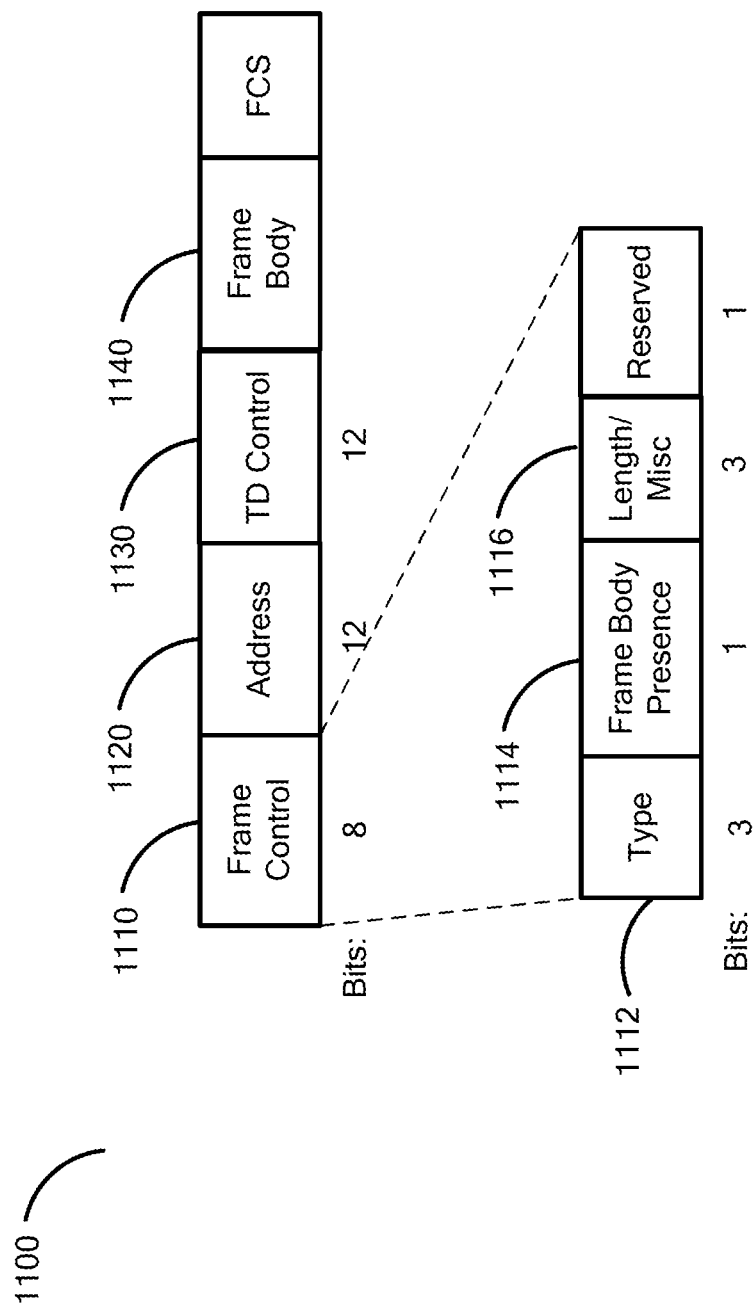
FIG. 11 is a diagram illustrating an example format of WUR frame according to the present disclosure.

FIG. 11 illustrates an example format of the WUR frame 1100 according to the present disclosure. The WUR frame 1100 comprises a Frame Control field 1110, an Address field 1120 and a TD (type dependent) Control field 1130. The WUR frame 1100 may comprise a Frame Body field 1140. The Frame Control field 1110 comprises a Type subfield 1112, a Frame Body Presence subfield 1114 and a Length/Misc subfield 1116. The Type subfield 1112 defines the type of the WUR frame 1100, as defined in FIG. 12. In particular, the WUR frame 1100 with the Type subfield 1112 of the Frame Control field 1110 set to 1 is WUR Wake-up frame. The Frame Body Presence subfield 1114 indicates the presence of the Frame Body field 1140 in the WUR frame 1100. The Length/Misc subfield 1116 contains the length of the Frame Body field 1140 if the Frame Body field 1140 is present in the WUR frame 1100 and contains bits that are expected to be used for other purposes otherwise.

The Address field 1120 contains an identifier for the WUR frame 1100. The identifier contained in the Address field 1120 depends on the type of the WUR frame 1100. In particular, as defined in FIG. 13, the Address field 1120 contains the Wake-up ID of the intended WUR STA when the WUR frame 1100 is unicast (i.e., individually addressed) WUR Wake-up frame, the group ID of the intended group of WUR STAs when the WUR frame 1100 is multicast (i.e., group addressed) WUR Wake-up frame, or the Transmit ID when the WUR frame 1100 is broadcast WUR Wake-up frame or WUR Beacon frame. Each of Wake-up ID, group ID and Transmit ID has a size of 12 bits. The 12-bit TD Control field 1130 contains control information that depends on the type of the WUR frame 1100. For example, if the WUR frame 1100 is WUR Beacon frame, the TD Control field 1130 contains partial TSF.

According to the present disclosure, the WUR Wake-up frame 1100 with the Address field 1120 set to a first special ID (e.g., 0x000) comprises the Frame Body field 1140 which contains two or more Wake-up IDs. In this case, this WUR Wake-up frame 1100 is used to wake up two or more WUR STAs. The first special ID is fixed or randomly selected by the AP 110 within the identifier's space. If the first special ID is randomly selected by the AP 110 within the identifier's space, it can be indicated in the First Special ID field 364 the the WUR Operation element 350. As a result, collision among the first special IDs within the BSSs of neighboring APs can be minimized.

According to the present disclosure, the WUR Wake-up frame 1100 with the Address field 1120 set to a second special ID is used to indicate that the AP 110 intends to transmit group addressed frames. The second special ID is fixed or randomly selected by the AP 110 within the identifier's space. If the second special ID is randomly selected by the AP 110 within the identifier's space, it can be indicated in the Second Special ID field 366 the the WUR Operation element 350. As a result, collision among the second special IDs within the BSSs of neighboring APs can be minimized.

According to the present disclosure, the Wake-up IDs assigned by the AP 110 to the associated WUR STAs, the group IDs assigned by the AP 110 to the associated WUR STAs, the first special ID, the second special ID and the Transmit ID of the AP 110 shall be different. As a result, a WUR STA is able to identify whether it is the intended recipient of a received WUR Wake-up frame based on its Address field, as illustrated in FIG. 13.

According to the present disclosure, the value range of group ID is a subset of consecutive values obtained from the identifier's space. The value range of group ID is configurable so that the value range of group ID for the BSSs of different APs may be different. As a result, the probability of assigning the same group ID by different APs is minimized, which is instrumental for a WUR STA to filter multicast WUR Wake-up frames properly using the Address field.

Figure 14A:
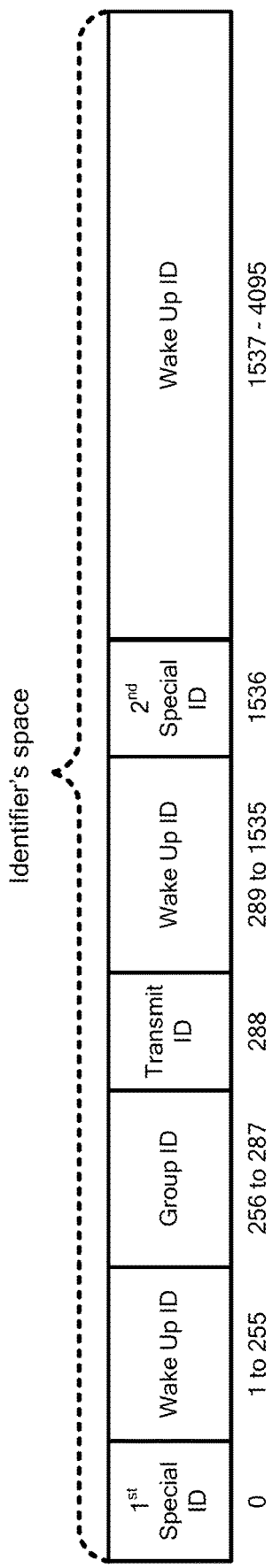
FIG. 14A is a diagram illustrating an example identifier's space according to the present disclosure.

FIG. 14A illustrates an example identifier's space according to the present disclosure. The identifier's space contains 4096 identifiers. In this example, the first special ID is 0, the second special ID is 1536 and the Transmit ID of the AP 110 is 288. The Wake-up ID assigned by the AP 110 to a specific WUR STA can be randomly selected from the value range of 1 to 255, 289 to 1535 and 1537 to 4095. The group ID assigned by the AP 110 to a specific group of WUR STAB can be randomly selected from the value range of 256 to 287 which contains consecutive 32 identifiers. In this example, the number of group IDs that can be provided by the AP 110 is 32.

According to the present disclosure, when a WUR STA receives a WUR PPDU containing WUR Wake-up frame, it may decode the Address field of the WUR Wake-up frame and perform a frame filtering procedure first.

Figure 14B:
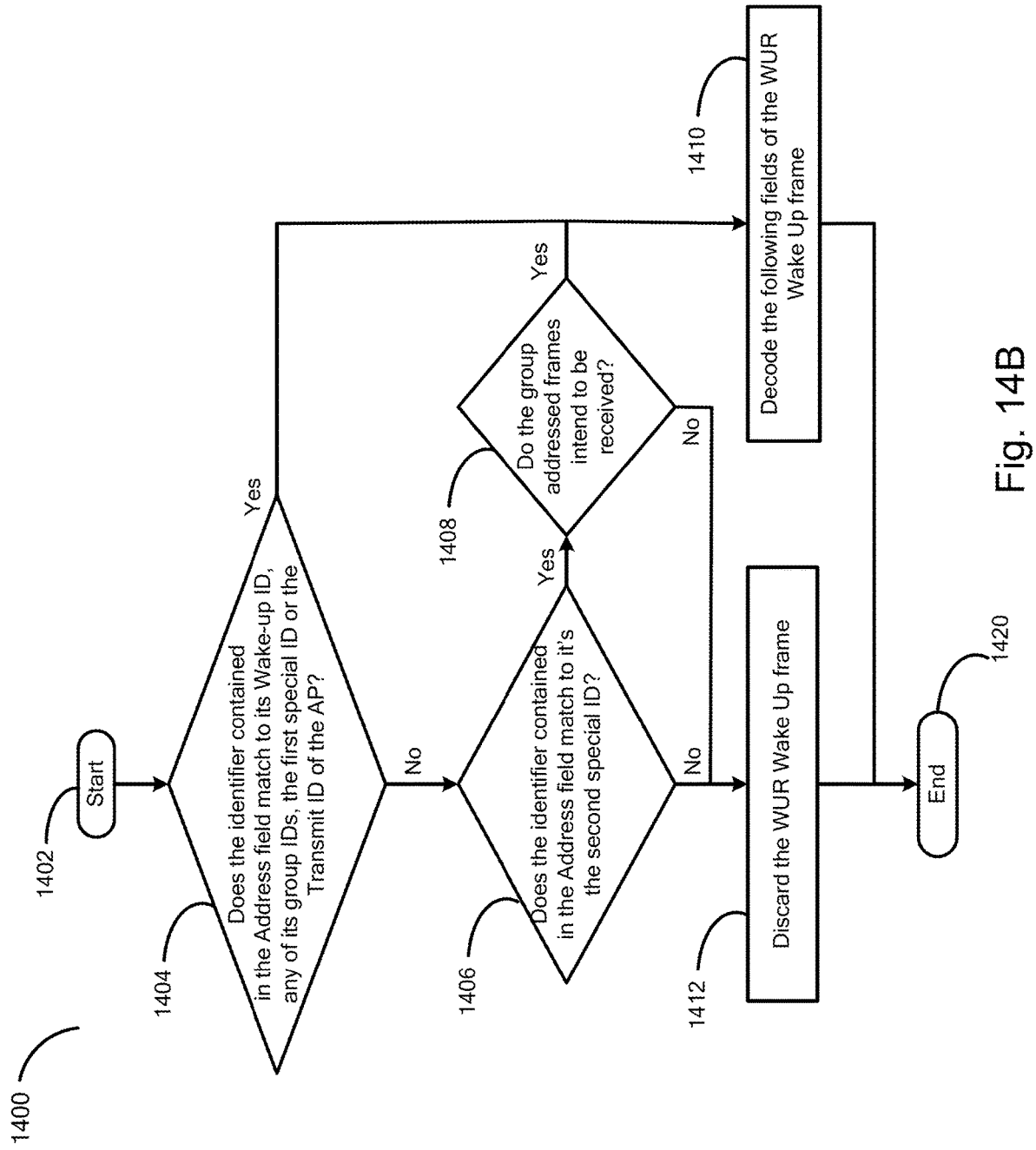
FIG. 14B is a flowchart illustrating an example frame filtering procedure according to the present disclosure.

FIG. 14B illustrates an example frame filtering procedure 1400 according to the present disclosure. The procedure 1400 starts at step 1402. At step 1404, the STA determines whether the identifier contained in the Address field of the received WUR Wake-up frame matches to its assigned Wake-up ID, any of its assigned group IDs, the first special ID or the Transmit ID of the AP 110. If the identifier contained in the Address field of the received WUR Wake-up frame matches to its assigned Wake-up ID, any of its assigned group IDs, the first special ID or the Transmit ID of the AP 110, the procedure 1400 proceeds to step 1410. Otherwise at step 1406 the STA determines whether the identifier contained in the Address field of the received WUR Wake-up frame matches to the second special ID. If the identifier contained in the Address field of the received WUR Wake-up frame does not match to the second special ID, the procedure 1400 proceeds to step 1412. Otherwise at step 1408 the STA determines whether it intends to receive group addressed frames. If it intends to receive group addressed frames, at step 1410 the STA decodes the fields following the Address field of the received WUR Wake-up frame. Otherwise at step 1412 the STA discards the received WUR Wake-up frame. The procedure 1400 stops at step 1420.

According to the present disclosure, when a WUR STA receives a WUR PPDU containing WUR Wake-up frame, by performing a frame filtering procedure 1400 as illustrated in FIG. 14B, the STA may decide not to decode the fields following the Address field of the WUR Wake-up frame and therefore power consumption of the STA can be reduced.

According to the present disclosure, the Wake-up ID assigned by the AP 110 to a WUR STA is indicated in the Wake-up ID field 810 of the WUR Parameters field 606 in the WUR Mode element 524 transmitted by the AP 110 (see FIG. 8B) during the WUR negotiation procedure (see FIG. 2 and FIG. 4) between the AP 110 and the STA.

According to the present disclosure, the Transmit ID of the AP 110 is algorithmically obtained from the BSSID (Basic Service Set Identifier) of the AP 110. As a result, collision among Transmit IDs of neighboring APs can be minimized.

According to the present disclosure, information on group IDs assigned by the AP 110 to a WUR STA is indicated in the Group ID List field 840 of the WUR Parameters field 606 in the WUR Mode element 524 transmitted by the AP 110 during the WUR negotiation procedure between the AP 110 and the STA.

(Group ID Assignment)

First Embodiment

FIG. 15 illustrates an example format of the Group ID List field 840 of the WUR Parameters field 606 in the WUR Mode element 524 transmitted by the AP 110 according to a first embodiment of the present disclosure. The Group ID List field 840 comprises a Number of Groups field 1502 and a Group ID Tuples field 1504. The Number of Groups field 1502 indicates the number of groups the intended WUR STA belongs to. If the intended WUR STA does not support the reception of group ID based multicast WUR Wake-up frames, the Number of Groups field 1502 shall be set to 0. The Group ID Tuples field 1504 contains group ID for each of the groups the intended WUR STA belongs to.

Considering the following example:
Group ID value range is 256 to 287 (i.e., the smallest group ID that can be provided by the AP 110 is 256 and the number of group IDs that can be provided by the AP 110 is 32).
6 group IDs assigned by the AP 110 to the WUR STA: 257, 261, 266, 268, 270 and 287.

According to the first embodiment of the present disclosure, the encoding of the Number of Group IDs field 1502 is 0b0110, while the encoding of the Group ID Tuples field 1504 is 0x101 105 10A 10C 10E 11F. In this example, the signaling overhead for the Group ID List field 840 is 76 bits.

According to the first embodiment of the present disclosure, after receiving the WUR Mode element 524 transmitted by the AP 110, for easy of storing group ID information, the WUR STA may reorganize the Group ID List field 840 into at least one group ID and a group ID bitmap whose size is not larger than the group ID bitmap size that it is capable of storing. In this case, for minimizing the memory requirement for storing group ID information, the AP 110 may assign group IDs to the WUR STA in such a manner that as many as assigned group IDs can be indicated by a group ID bitmap that the WUR STA is capable of storing and a group ID corresponding to bit 0 of the group ID bitmap.

Second Embodiment

Figure 16:
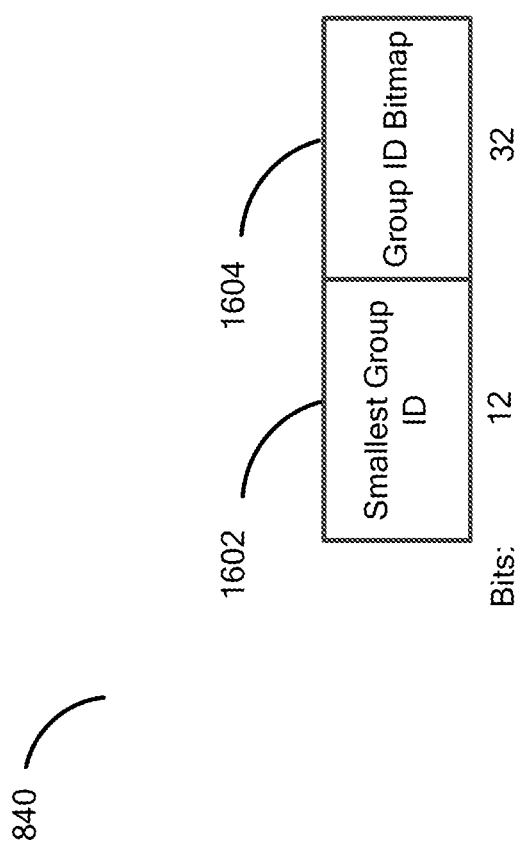
FIG. 16 is a diagram illustrating an example format of the Group ID List field according to a second embodiment of the present disclosure.

FIG. 16 illustrates an example format of the Group ID List field 840 of the WUR Parameters field 606 in the WUR Mode element 524 transmitted by the AP 110 according to a second embodiment of the present disclosure. The Group ID List field 840 comprises a Smallest Group ID field 1602 and a Group ID Bitmap field 1604. The Smallest Group ID field 1602 indicates the smallest group ID that can be provided by the AP 110. The Group ID Bitmap field 1604, together with the Smallest Group ID field 1602, indicates Group IDs which are assigned by the AP 110 to the intended WUR STA. The size of the Group ID Bitmap field 1604 is the same as the number of group IDs that can be provided by the AP 110 (e.g., 32). The Group ID Bitmap field 1604 starts with the LSB (Least Significant Bit) (i.e., bit 0). The group IDs assigned by the AP 110 to the intended WUR STA equal to the smallest group ID indicated in the Smallest Group ID field 1602 plus the bit position when the bit in the Group ID Bitmap field 1604 is set to 1. If the intended WUR STA does not support the reception of group ID based multicast WUR Wake-up frames, the Group ID Bitmap field 1604 shall be set to all 0.

Considering the following example:
Group ID value range is 256 to 287 (i.e., the smallest group ID is 256 and the number of group IDs that can be provided by the AP 110 is 32).
6 group IDs assigned by the AP 110 to the WUR STA: 257, 261, 266, 268, 270 and 287.

According to the second embodiment of the present disclosure, the encoding of the Smallest Group ID field 1602 is 0x100, and the encoding of the Group ID Bitmap field 1604 is 0x80005422. In this example, the signaling overhead for the Group ID List field 840 is 44 bits. So the second embodiment may result in less signaling overhead than the first embodiment.

According to the second embodiment of the present disclosure, alternatively, the smallest group ID that can be provided by the AP 110 can be indicated in the Smallest Group ID field 362 in the WUR Operation element 350 since the smallest group ID that can be provided by the AP 110 is a common WUR parameter to all WUR STAB. In this case, the group IDs assigned by the AP 110 to the intended WUR STA equal to the smallest group ID indicated in the Smallest Group ID field 362 in the most recently received WUR Operation element 350 plus the bit position when the bit in the Group ID Bitmap field 1604 is set to 1.

According to the second embodiment of the present disclosure, If the group ID bitmap size that the intended WUR STA is capable of storing is smaller than the number of group IDs that can be provided by the AP 110, the WUR STA cannot directly store the group ID bitmap contained in the Group ID Bitmap field 1604 in the received WUR Mode element 524. As a result, after receiving the WUR Mode element 524 transmitted by the AP 110, for easy of storing group ID information, the WUR STA may reorganize the Group ID List field 840 into at least one group ID and a group ID bitmap with size not larger than the group ID bitmap size that it is capable of storing. In this case, for minimizing the memory requirement for storing group ID information, the AP 110 may assign group IDs to the WUR STA in such a manner that as many as assigned group IDs can be indicated by a group ID bitmap that the WUR STA is capable of storing and a group ID corresponding to bit 0 of the group ID bitmap.

Third Embodiment

Figure 17:
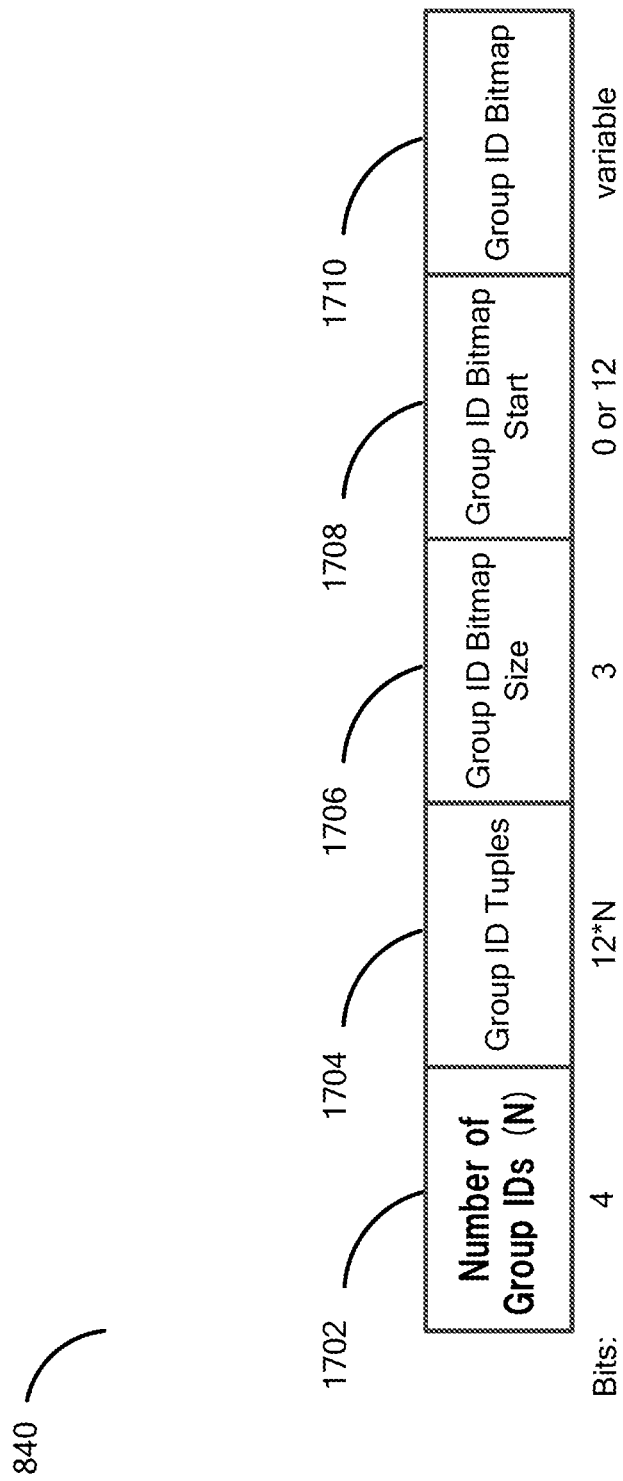
FIG. 17 is a diagram illustrating an example format of the Group ID List field according to a third embodiment of the present disclosure.

FIG. 17 illustrates an example format of the Group ID List field 840 of the WUR Parameters field 606 in the WUR Mode element 524 transmitted by the AP 110 according to a third embodiment of the present disclosure. The Group ID List field 840 comprises a Number of Group IDs field 1702, a Group ID Tuples field 1704, a Group ID Bitmap Size field 1706, a Group ID Bitmap Start field 1708 and a Group ID Bitmap field 1710. The Number of Group IDs field 1702 indicates the number of group IDs which are assigned by the AP 110 to the intended WUR STA and contained in the Group ID Tuples field 1704. The Group ID Bitmap Size field 1706 indicates the size of the Group ID Bitmap field 1710. If the number of group IDs that can be provided by the AP 110 is 64, the Group ID Bitmap Size field 1706 may have a size of 3 bits. In this case, the Group ID Bitmap Size field 1706 is set to 0 to indicate that the Group ID Bitmap Start field 1708 and the Group ID Bitmap field 1710 are not present. The Group ID Bitmap Size field 1706 is set to 1, 2, 3 or 4 to indicate that the Group ID Bitmap field 1710 contains a 8-bit, 16-bit, 32-bit or 64-bit bitmap. The Group ID Bitmap Start field 1708 indicates the group ID corresponding to the LSB (i.e., bit 0) of the Group ID Bitmap field

1710. The Group ID Bitmap Start field 1708 shall be set in such a manner that the group ID bitmap does not indicate any group ID out of the Group ID value range. The Group ID Bitmap field 1710 indicates the remaining group IDs which are assigned by the AP 110 to the intended WUR STA. The remaining group IDs assigned by the AP 110 to the intended WUR STA equal to the group ID indicated in the Group ID Bitmap Start field 1708 plus the bit position when the bit in the Group ID Bitmap field 1710 is set to 1. The size of the Group ID Bitmap field 1710 shall not be larger than the group ID bitmap size that the intended WUR STA is capable of storing. If the intended WUR STA does not support the reception of group ID based multicast WUR Wake-up frames, both the Number of Group IDs field 1702 and the Group ID Bitmap Size field 1706 shall be set to 0.

According to the third embodiment of the present disclosure, after receiving the WUR Mode element 524 transmitted by the AP 110, the WUR STA can directly store Group ID information based on the Group ID Tuples field 1704, the Group ID Bitmap Start field 1708 and the Group ID Bitmap field 1710. In this case, for minimizing the memory requirement for storing group ID information, the AP 110 may assign group IDs to the WUR STA in such a manner that as many as assigned group IDs can be indicated by a group ID bitmap contained in the Group ID Bitmap field 1710 and a group ID contained in the Group ID Bitmap Start field 1708. Since it is unnecessary for the WUR STA to reorganize the Group ID List field 840 into at least one group ID and a group ID bitmap with size not larger than the group ID bitmap size that it is capable of storing, implementation complexity of the WUR STA is reduced.

Considering the following example:
  Group ID value range is 256 to 287 (i.e., the smallest group ID that can be provided by the AP 110 is 256 and the number of group ID that can be provided by the AP 110 is 32).
  6 group IDs assigned by the AP 110 to the WUR STA: 257, 261, 266, 268, 270 and 287.
  The intended WUR STA is capable of storing 16-bit group ID bitmap.

According to the third embodiment of the present disclosure, the encoding of the Number of Group IDs field 1702 is 0b0001, the encoding of the Group ID Tuples field 1704 is 0x11F, the encoding of the Group ID Bitmap Size field 1706 is 0b010, the encoding of the Group ID Bitmap Start field 1708 is 0x101 and the encoding of the Group ID Bitmap field 1710 is 0x2A11. In this example, the signaling overhead for the Group ID List field 840 is 47 bits. The memory required for storing the group ID information is 40 bits.

Fourth Embodiment

Figure 18:
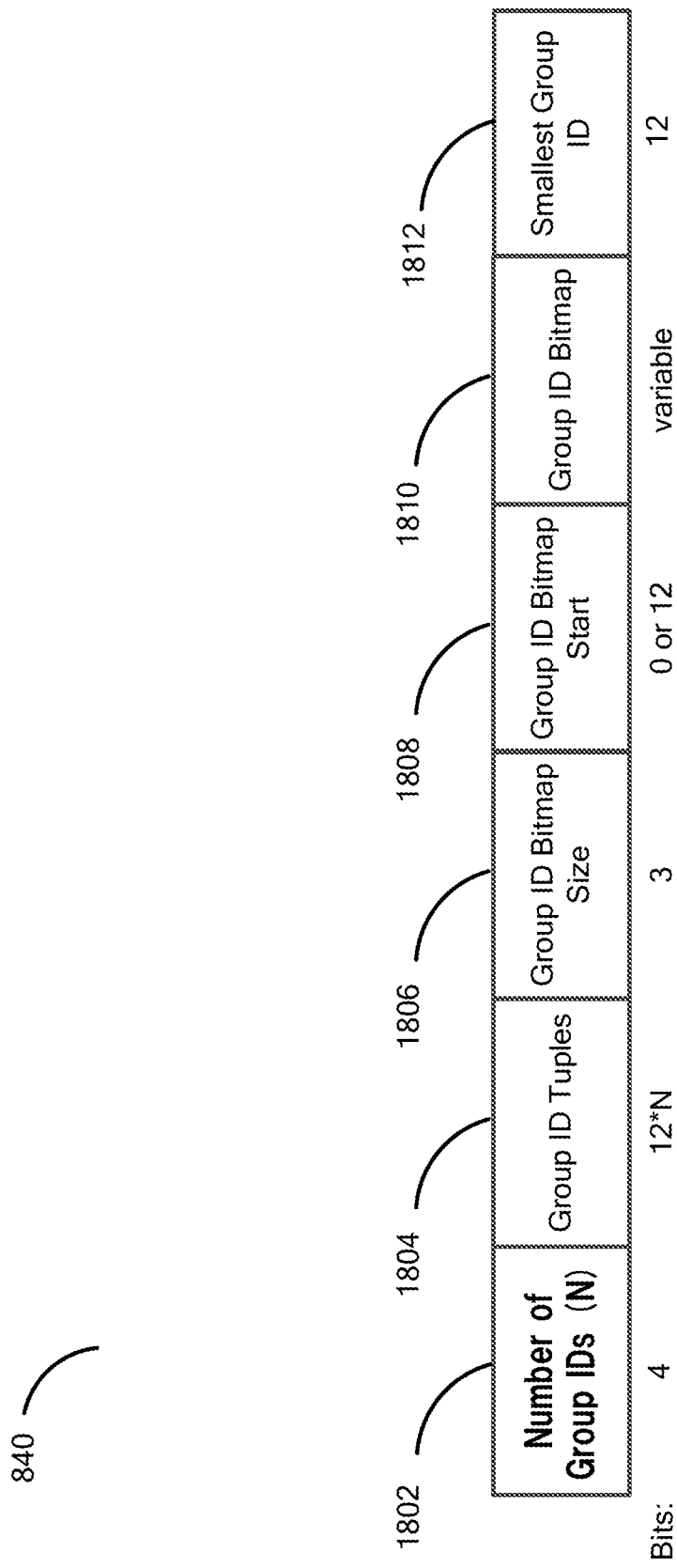
FIG. 18 is a diagram illustrating an example format of the Group ID List field according to a fourth embodiment of the present disclosure.

FIG. 18 illustrates an example format of the Group ID List field 840 of the WUR Parameters field 606 in the WUR Mode element 524 transmitted by the AP 110 according to a fourth embodiment of the present disclosure. The Group ID List field 840 comprises a Number of Group IDs field 1802, a Group ID Tuples field 1804, a Group ID Bitmap Size field 1806, a Group ID Bitmap field 1810 and a Smallest Group ID field 1812. The Number of Group IDs field 1802 indicates the number of group IDs which are assigned by the AP 110 to the intended WUR STA and contained in the Group ID Tuples field 1804. The Group ID Bitmap Size field 1806 indicates the size of the Group ID Bitmap field 1810. If the number of group IDs that can be provided by the AP 110 is 64, the Group ID Bitmap Size field 1806 may have a size of 3 bits. In this case, the Group ID Bitmap Size field 1806 is set to 0 to indicate that the Group ID Bitmap Start field 1808 and the Group ID Bitmap field 1810 are not present (i.e., no any group ID is assigned by the AP 110 to the WUR STA). The Group ID Bitmap Size field 1806 is set to 1, 2, 3 or 4 to indicate that the Group ID Bitmap field 1810 contains a 8-bit, 16-bit, 32-bit or 64-bit bitmap. The Group ID Bitmap Start field 1808 indicates the group ID corresponding to the LSB (i.e., bit 0) of the Group ID Bitmap field 1810. The Group ID Bitmap field 1810, together with the Group ID Bitmap Start field 1808, indicates the remaining group IDs which are assigned by the AP 110 to the intended WUR STA. The Smallest Group ID field 1812 indicates the smallest Group ID that can be provided by the AP 110.

According to the fourth embodiment of the present disclosure, if the intended WUR STA does not support the reception of group ID based multicast WUR Wake-up frames, both the Number of Group IDs field 1802 and the Group ID Bitmap Size field 1806 shall be set to 0.

According to the fourth embodiment of the present disclosure, when bit Y in the Group ID Bitmap field 1810 is set to 1 (Y=0, 1, . . . , L−1 and L is the size of the Group ID Bitmap field 1810), if the group ID indicated in the Group ID Bitmap Start field 1808 plus Y is larger than the largest group ID that can be provided by the AP 110, the corresponding group ID equals to the group ID indicated in the Group ID Bitmap Start field 1808 plus Y minus the number of group IDs that can be provided by the AP 110; Otherwise the corresponding group ID equals to the group ID indicated in the Group ID Bitmap Start field 1808 plus Y. Notice that the largest group ID that can be provided by the AP 110 is equal to the smallest group ID that can be provided by the AP 110 and indicated in the Smallest Group ID field 1812 plus the number of group IDs that can be provided by the AP 110 minus 1.

According to the fourth embodiment of the present disclosure, the smallest group ID that can be provided by the AP 110 may be indicated in the Smallest Group ID field 362 in the WUR Operation element 350 instead of the Smallest Group ID field 1812 in the WUR Mode element 524 since the smallest group ID that can be provided by the AP 110 is a common WUR parameter to all WUR STAs. In this case, a WUR STA is able to know the smallest group ID that can be provided by the AP 110 from the most recently received WUR Operation element 350.

According to the fourth embodiment of the present disclosure, instead of indicating the smallest group ID that can be provided by the AP 110 in the Smallest Group ID field 362 in the WUR Operation element 350 or the Smallest Group ID field 1812 in the WUR Mode element 524, the largest group ID that can be provided by the AP 110 may be indicated in the WUR Operation element 350 or in the WUR Parameters field 606 of the WUR Mode element 524 transmitted by the AP 110. If the largest Group ID is indicated in the WUR Operation element 350, a WUR STA is able to know the largest Group ID that can be provided by the AP 110 from the most recently received WUR Operation element 350.

According to the fourth embodiment of the present disclosure, after receiving the WUR Mode element 524 transmitted by the AP 110, the WUR STA can directly store group ID information based on the Group ID Tuples field 1804, the Group ID Bitmap Start field 1808 and the Group ID Bitmap field 1810. In this case, for minimizing the memory requirement for storing group ID information, the AP 110 may assign group IDs to the WUR STA in such a manner that as many as assigned group IDs can be indicated by a group ID bitmap contained in the Group ID Bitmap field 1810 and a group ID contained in the Group ID Bitmap Start field 1808. Since it is unnecessary for the WUR STA to reorganize the Group ID List field 840 into at least one group ID and a group ID bitmap with size not larger than the group ID bitmap size that it is capable of storing, implementation complexity of the WUR STA is reduced Considering the following example:
Group ID value range is 256 to 287 (i.e., the smallest group ID that can be provided by the AP 110 is 256 and the number of group IDs that can be provided by the AP 110 is 32).
6 group IDs assigned by the AP 110 to the WUR STA: 257, 261, 266, 268, 270 and 287.
The intended WUR STA is capable of storing 16-bit group ID bitmap.
The smallest group ID that can be provided by the AP 110 is indicated in the WUR Operation element 350.

According to the fourth embodiment of the present disclosure, the encoding of the Number of Group IDs field 1802 is 0b0000, the encoding of the Group ID Bitmap Size field 1806 is 0b010, the encoding of the Group ID Bitmap Start field 1808 is 0x11F, and the encoding of the Group ID Bitmap field 1810 is 0xA845. In this example, the signaling overhead for the Group ID List field 840 is 35 bits. The memory required for storing the group ID information is 28 bits. So the fourth embodiment may result in less signaling overhead than the third embodiment. Furthermore, the fourth embodiment may result in less memory requirement for storing the group ID information than the third embodiment.

Fifth Embodiment

According to a fifth embodiment of the present disclosure, if the Supported Group IDs field 308 of the WUR Capabilities element 300 transmitted by the WUR STA is set to a non-zero value and the WUR STA belongs to at least one group of WUR STAB, group IDs shall be assigned by the AP 110 to the WUR STA in such a manner that at least one of the following is satisfied:

the smallest group ID that is assigned by the AP 110 to the WUR STA substracted from the largest group ID that is assigned by the AP 110 to the WUR STA is smaller than the group ID bitmap size that the WUR STA is capable of storing;

the sum of a first number and a second number is smaller than the group ID bitmap size that the WUR STA is capable of storing minus one; wherein the first number is derived by substracting the smallest group ID that can be provided by the AP 110 from a first group ID that is assigned by the AP 110 to the WUR STA; and the second number is derived by subtracting a second group ID that is assigned by the AP 110 to the WUR STA from the largest group ID that can be provided by the AP 110; wherein the first group ID is smaller than the second group ID and no any group ID between the first group ID and the second group ID is assigned by the AP 110 to the WUR STA; wherein the first group ID may be the largest group ID that is assigned by the AP 110 to the WUR STA and within the lower half of the group ID value range; and the second group ID may be the smallest group ID that is assigned by the AP 110 and within the upper half of the group ID value range.

By doing so, group IDs assigned by the AP 110 to the WUR STA can be indicated in a group ID bitmap which the WUR STA is capable of storing and a group ID corresponding to bit 0 of the group ID bitmap. As a result, the WUR STA's memory required for storing group ID information is minimized.

Figure 19:
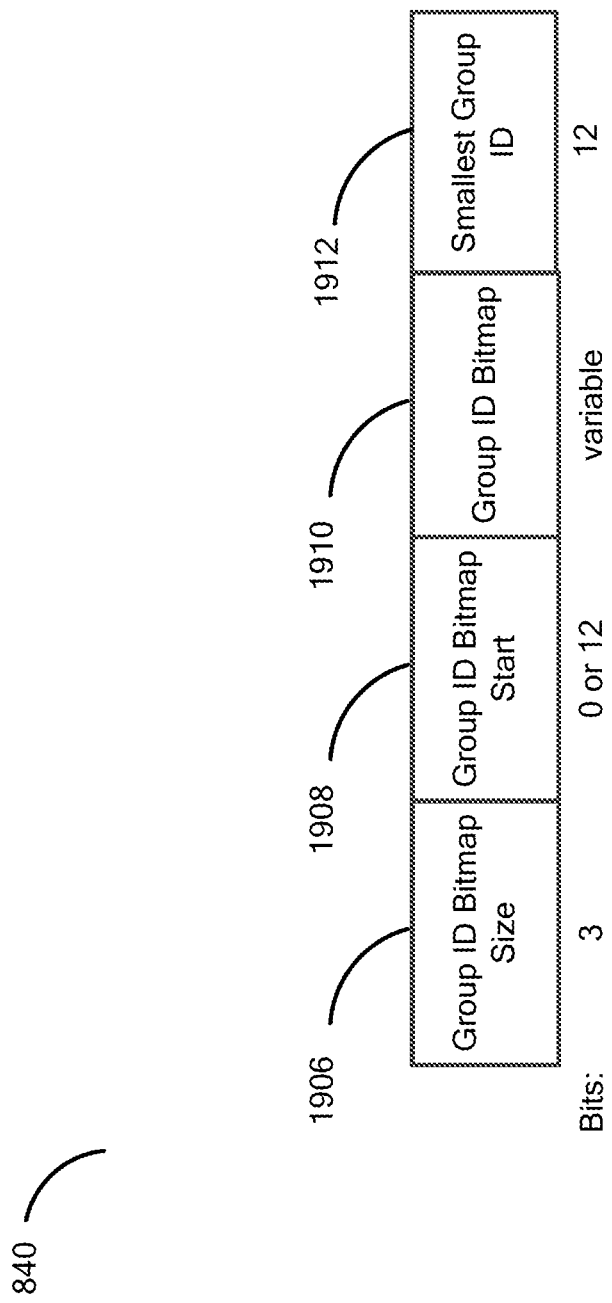
FIG. 19 is a diagram illustrating an example format of the Group ID List field according to a fifth embodiment of the present disclosure.

FIG. 19 illustrates an example format of the Group ID List field 840 of the WUR Parameters field 606 in the WUR Mode element 524 transmitted by the AP 110 according to the fifth embodiment of the present disclosure. The Group ID List field 840 comprises a Group ID Bitmap Size field 1906, a Group ID Bitmap Start field 1908, a Group ID Bitmap field 1910 and a Smallest Group ID field 1912. The Group ID Bitmap Size field 1906 indicates the size of the Group ID Bitmap field 1910. If the number of group IDs that can be provided by the AP 110 is 64, the Group ID Bitmap Size field 1906 may have a size of 3 bits. In this case, the Group ID Bitmap Size field 1906 is set to 0 to indicate that the Group ID Bitmap Start field 1908 and the Group ID Bitmap field 1910 are not present (i.e., no group ID is assigned by the AP 110 to the WUR STA). The Group ID Bitmap Size field 1906 is set to 1, 2, 3 or 4 to indicate that the Group ID Bitmap field 1910 contains a 8-bit, 16-bit, 32-bit or 64-bit bitmap. The Group ID Bitmap Start field 1908 indicates the group ID corresponding to the LSB (i.e., bit 0) of the Group ID Bitmap field 1910. The Group ID Bitmap field 1910, together with the Group ID Bitmap Start field 1908, indicates the group IDs which are assigned by the AP 110 to the intended WUR STA. The Smallest Group ID field 1812 indicates the smallest Group ID that can be provided by the AP 110.

According to the fifth embodiment of the present disclosure, if the intended WUR STA does not support the reception of group ID based multicast WUR Wake-up frames, the Group ID Bitmap Size field 1906 shall be set to 0.

According to the fifth embodiment of the present disclosure, when bit Y in the Group ID Bitmap field 1910 is set to 1 (Y=0, 1, . . . , L−1 and L is the size of the Group ID Bitmap field 1910), if the group ID indicated in the Group ID Bitmap Start field 1908 plus Y is larger than the largest group ID that can be provided by the AP 110, the corresponding group ID equals to the group ID indicated in the Group ID Bitmap Start field 1908 plus Y minus the number of group IDs that can be provided by the AP 110; Otherwise the corresponding group ID equals to the the group ID indicated in the Group ID Bitmap Start field 1908 plus Y. Notice that the largest group ID that can be provided by the AP 110 is equal to the smallest group ID that can be provided by the AP 110 plus the number of group IDs that can be provided by the AP 110 minus 1.

According to the fifth embodiment of the present disclosure, the smallest group ID that can be provided by the AP 110 may be indicated in the Smallest Group ID field 362 in the WUR Operation element 350 instead of the Smallest Group ID field 1912 in the WUR Mode element 524 since the smallest group ID that can be provided by the AP 110 is a common WUR parameter to all WUR STAs. In this case, a WUR STA is able to know the smallest group ID that can be provided by the AP 110 from the most recently received WUR Operation element 350.

According to the fifth embodiment of the present disclosure, instead of indicating the smallest group ID that can be provided by the AP 110 in the Smallest Group ID field 362 in the WUR Operation element 350 or the Smallest Group ID field 1912 in the WUR Mode element 524, the largest group ID that can be provided by the AP 110 may be indicated in the WUR Operation element 350 or in the WUR Parameters field 606 of the WUR Mode element 524 transmitted by the AP 110. If the largest Group ID is indicated in the WUR Operation element 350, a WUR STA is able to know the largest Group ID that can be provided by the AP 110 from the most recently received WUR Operation element 350.

According to the fifth embodiment of the present disclosure, after receiving the WUR Mode element 524 transmitted by the AP 110, the WUR STA can directly store group ID information based on the Group ID Bitmap Start field 1908 and the Group ID Bitmap 1910. Compared with the fourth embodiment, the memory requirement for storing group ID information may be reduced.

Considering the following example:
Group ID value range is 256 to 287 (i.e., the smallest group ID that can be provided by the AP 110 is 256 and the number of group IDs that can be provided by the AP 110 is 32).
6 group IDs assigned by the AP 110 to the WUR STA: 257, 261, 266, 268, 270 and 287.
The intended WUR STA is capable of storing 16-bit group ID bitmap.
The smallest group ID that can be provided by the AP 110 is indicated in the WUR Operation element 350.

Notice that in this example, the difference between the smallest group ID and the largest group ID assigned to the WUR STA is 30, which is larger than the group ID bitmap size that the WUR STA is capable of storing. However, the sum of the difference between the smallest group ID assigned to the WUR STA and the smallest group ID that can be provided by the AP 110 and the difference between the largest group ID assigned to the WUR STA and the largest group ID that can be provided by the AP 110 is 1, which is smaller than the group ID bitmap size that the WUR STA is capable of storing. According to the fifth embodiment of the present disclosure, the encoding of the Group ID Bitmap Size field 1906 is 0b010, the encoding of the Group ID Bitmap Start field 1908 is 0x11F, and the encoding of the Group ID Bitmap field 1910 is 0xA845. In this example, the signaling overhead for the Group ID List field 840 is 31 bits. The memory required for storing the group ID information is 28 bits. So the fifth embodiment results in less signaling overhead than the fourth embodiment.

Sixth Embodiment

According to a sixth embodiment of the present disclosure, if the Supported Group IDs field 308 of the WUR Capabilities element 300 transmitted by the WUR STA is set to 0, the Group ID List field 840 is not present in the WUR Parameters field 606 in the WUR Mode element 524 transmitted by the AP 110. As a result, signaling overhead for the Group ID List field 840 is eliminated for the WUR STA which does not support the reception of group ID based multicast WUR Wake-up frames.

According to a sixth embodiment of the present disclosure, if the Supported Group IDs field 308 of the WUR Capabilities element 300 transmitted by the WUR STA is set to a non-zero value but the WUR STA does not belong to any group of WUR STAs, the Group ID List field 840 is not present in the WUR Parameters field 606 in the WUR Mode element 524 transmitted by the AP 110. As a result, signaling overhead for the Group ID List field 840 is eliminated for the WUR STA which supports the reception of group ID based multicast WUR Wake-up frames but does not belong to any group of WUR STAs.

According to the sixth embodiment of the present disclosure, if the Supported Group IDs field 308 of the WUR Capabilities element 300 transmitted by the WUR STA is set to a non-zero value and the WUR STA belongs to at least one group of WUR STAs, the Group ID List field 840 is present in the WUR Parameters field 606 in the WUR Mode element 524 transmitted by the AP 110. Moreover, group IDs shall be assigned by the AP 110 to the WUR STA in such a manner that at least one of the following is satisfied:
the smallest group ID that is assigned by the AP 110 to the WUR STA subtracted from the largest group ID that is assigned by the AP 110 to the WUR STA is smaller than the group ID bitmap size that the WUR STA is capable of storing;
the sum of a first number and a second number is smaller than the group ID bitmap size that the WUR STA is capable of storing minus one; wherein the first number is derived by substracting the smallest group ID that can be provided by the AP 110 from a first group ID that is assigned by the AP 110 to the WUR STA; and the second number is derived by subtracting a second group ID that is assigned by the AP 110 to the WUR STA from the largest group ID that can be provided by the AP 110; wherein the first group ID is smaller than the second group ID and no any group ID between the first group ID and the second group ID is assigned by the AP 110 to the WUR STA; wherein the first group ID may be the largest group ID that is assigned by the AP 110 to the WUR STA and within the lower half of the group ID value range; and the second group ID may be the smallest group ID that is assigned by the AP 110 and within the upper half of the group ID value range.

By doing so, group IDs assigned by the AP 110 to the WUR STA can be indicated in a group ID bitmap which the WUR STA is capable of storing and a group ID corresponding to bit 0 of the group ID bitmap. As a result, the WUR STA's memory required for storing group ID information is minimized.

Figure 20:
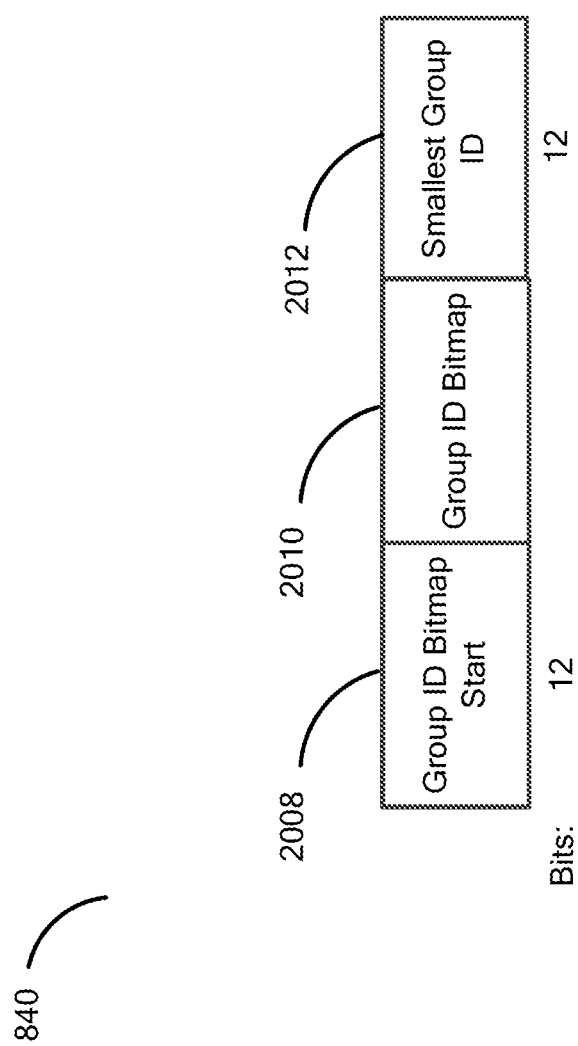
FIG. 20 is a diagram illustrating an example format of the Group ID List field according to a sixth embodiment of the present disclosure.

FIG. 20 illustrates an example format of the Group ID List field 840 of the WUR Parameters field 606 in the WUR Mode element 524 transmitted by the AP 110 according to the sixth embodiment of the present disclosure. The Group ID List field 840 comprises a Group ID Bitmap Start field 2008, a Group ID Bitmap field 2010 and a Smallest Group ID field 2012. The Group ID Bitmap Start field 2008 indicates the group ID corresponding to the LSB (i.e., bit 0) of the Group ID Bitmap field 2010. The Group ID Bitmap field 2010 indicates the group IDs which are assigned by the AP 110 to the intended WUR STA. The size of the Group ID Bitmap field 2010 is the same as the group ID bitmap size which the WUR STA is capable of storing, as indicated in the Supported Group IDs field 308 of the WUR Capabilities element 300 transmitted by the WUR STA. For example, if the WUR STA is capable of storing 32-bit group ID bitmap, the size of the Group ID Bitmap field 2010 is 32 bits. The Smallest Group ID field 2012 indicates the smallest Group ID that can be provided by the AP 110.

According to the sixth embodiment of the present disclosure, compared with the fifth embodiment, the signaling overhead of the Group ID List field 840 is reduced for the WUR STA which supports the reception of group ID based multicast WUR Wake-up frames.

According to the sixth embodiment of the present disclosure, when bit Y in the Group ID Bitmap field 2010 is set to 1 (Y=0, 1, . . . , L−1 and L is the size of the Group ID Bitmap field 2010), if the group ID indicated in the Group ID Bitmap Start field 2008 plus Y is larger than the largest group ID that can be provided by the AP 110, the corresponding group ID equals to the group ID indicated in the Group ID Bitmap Start field 2008 plus Y minus the number of group IDs that can be provided by the AP 110; Otherwise the corresponding group ID equals to the the group ID indicated in the Group ID Bitmap Start field 2008 plus Y. Notice that the largest group ID that can be provided by the AP 110 is equal to the smallest group ID that can be provided by the AP 110 plus the number of group IDs that can be provided by the AP 110 minus 1.

According to the sixth embodiment of the present disclosure, the smallest group ID that can be provided by the AP 110 may be indicated in the Smallest Group ID field 362 in the WUR Operation element 350 instead of the Smallest Group ID field 2012 in the WUR Mode element 524 since the smallest group ID that can be provided by the AP 110 is a common WUR parameter to all WUR STAs. In this case, a WUR STA is able to know the smallest group ID that can be provided by the AP 110 from the most recently received WUR Operation element 350.

According to the sixth embodiment of the present disclosure, instead of indicating the smallest group ID that can be provided by the AP 110 in the Smallest Group ID field 362 in the WUR Operation element 350 or the Smallest Group ID field 2012 in the WUR Mode element 524, the largest group ID that can be provided by the AP 110 may be indicated in the WUR Operation element 350 or in the WUR Parameters field 606 of the WUR Mode element 524 transmitted by the AP 110. If the largest Group ID is indicated in the WUR Operation element 350, a WUR STA is able to know the largest Group ID that can be provided by the AP 110 from the most recently received WUR Operation element 350.

According to the sixth embodiment of the present disclosure, after receiving the WUR Mode element 524 transmitted by the AP 110, the WUR STA can directly store group ID information based on the Group ID Bitmap Start field 2008 and the Group ID Bitmap 2010.

Considering the following example:
  Group ID value range is 256 to 287 (i.e., the smallest group ID that can be provided by the AP 110 is 256 and the number of group IDs that can be provided by the AP 110 is 32).
  6 group IDs assigned by the AP 110 to the WUR STA: 257, 261, 266, 268, 270 and 287.
  The intended WUR STA is capable of storing 16-bit group ID bitmap.
  The smallest group ID that can be provided by the AP 110 is indicated in the WUR Operation element 350.

Notice that in this example, the difference between the smallest group ID and the largest group ID assigned to the WUR STA is 30, which is larger than the group ID bitmap size that the WUR STA is capable of storing. However, the sum of the difference between the smallest group ID assigned to the WUR STA and the smallest group ID that can be provided by the AP 110 and the difference between the largest group ID assigned to the WUR STA and the largest group ID that can be provided by the AP 110 is 1 which is smaller than the group ID bitmap size that the WUR STA is capable of storing. According to the sixth embodiment of the present disclosure, the encoding of the Group ID Bitmap Start field 2008 is 0x11F and the encoding of the Group ID Bitmap field 2010 is 0xA845. In this example, the signaling overhead for the Group ID List field 840 is 28 bits. The memory required for storing the group ID information is 28 bits.

(Group ID Update Procedure)

The AP 110 may need to reassign Group IDs to one or more groups of WUR STAs to optimize Group ID assignment in order to minimize WUR STAs' memory requirement for storing Group ID information. For example, there are a first group of WUR STAs with Group ID=257 and a second group of WUR STAs with Group ID=270 in the BSS of the AP 110; and WUR STAs in the first and second groups are capable of storing 16-bit Group ID bitmap. A new WUR STA which is capable of storing 8-bit Group ID bitmap has just joined the BSS of the AP 110. The AP 110 intends to make the new WUR STA belong to both the first group and the second group. For the purpose of minimizing the new WUR STA's memory requirement for storing Group ID information, the AP 110 may initiate a Group ID update procedure to change the Group ID of the second group so that the difference between the Group ID of the first group and the new Group ID of the second group is less than 8 (e.g., the new Group ID of the second group is changed to 258). By doing so, the new WUR STA only need to store a single Group ID and a 8-bit Group ID bitmap to store Group ID information.

Figure 21A:
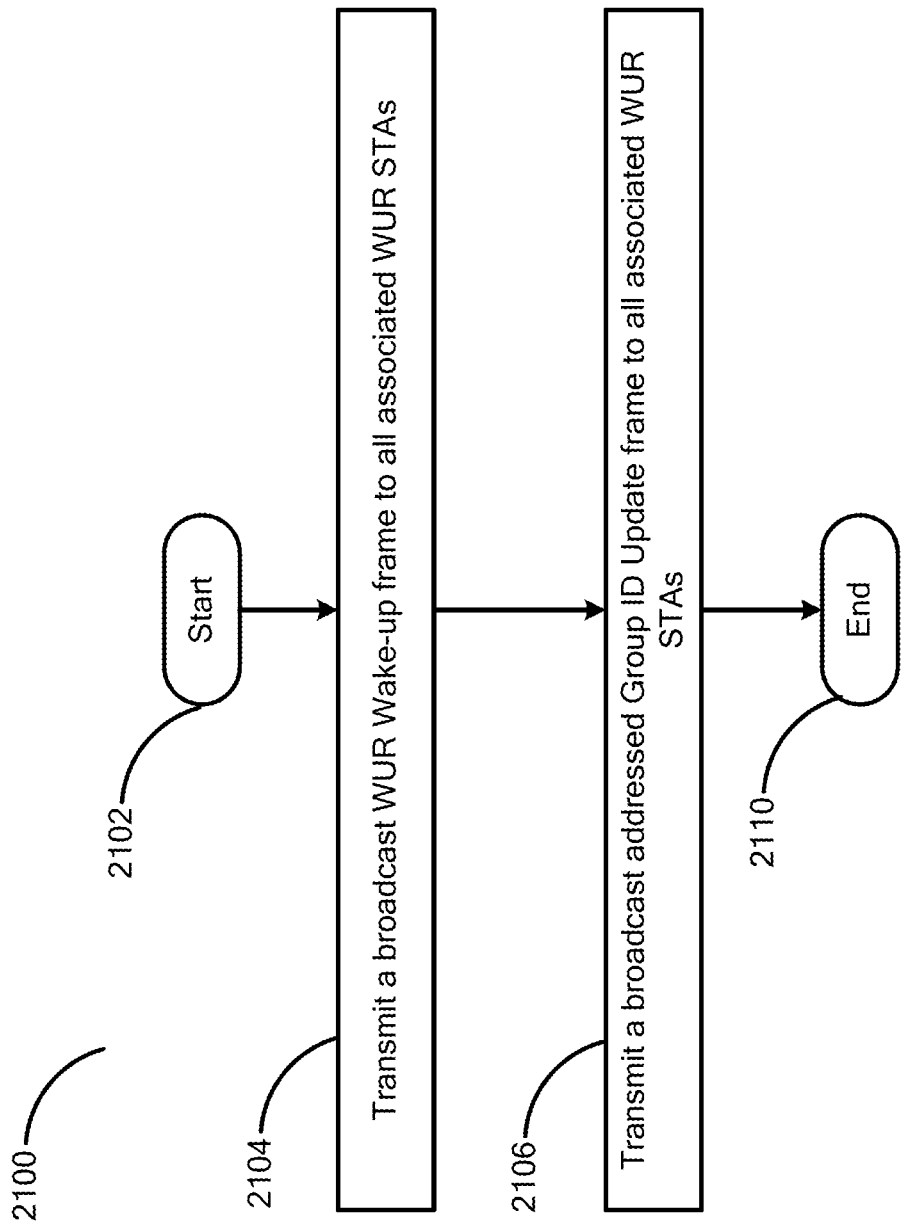
FIG. 21A is a flowchart illustrating a first example group ID update procedure according to the present disclosure.

FIG. 21A illustrates a first example Group ID update procedure 2100 according to the present disclosure. The procedure 2100 starts at step 2102. At step 2104, the AP 110 transmits a broadcast WUR Wake-up frame to all WUR STAs in WUR Mode. After receiving the broadcast WUR Wake-up frame by its WURx, the PCR of each WUR STA in WUR Mode transits to the awake state. At step 2106, the AP 110 transmits a broadcast addressed Group ID Update frame to all WUR STAs. After receiving the broadcast addressed Group ID Update frame by its PCR, each WUR STA stores the updated Group ID information. The procedure 2100 stops at step 2110.

Figure 21B:
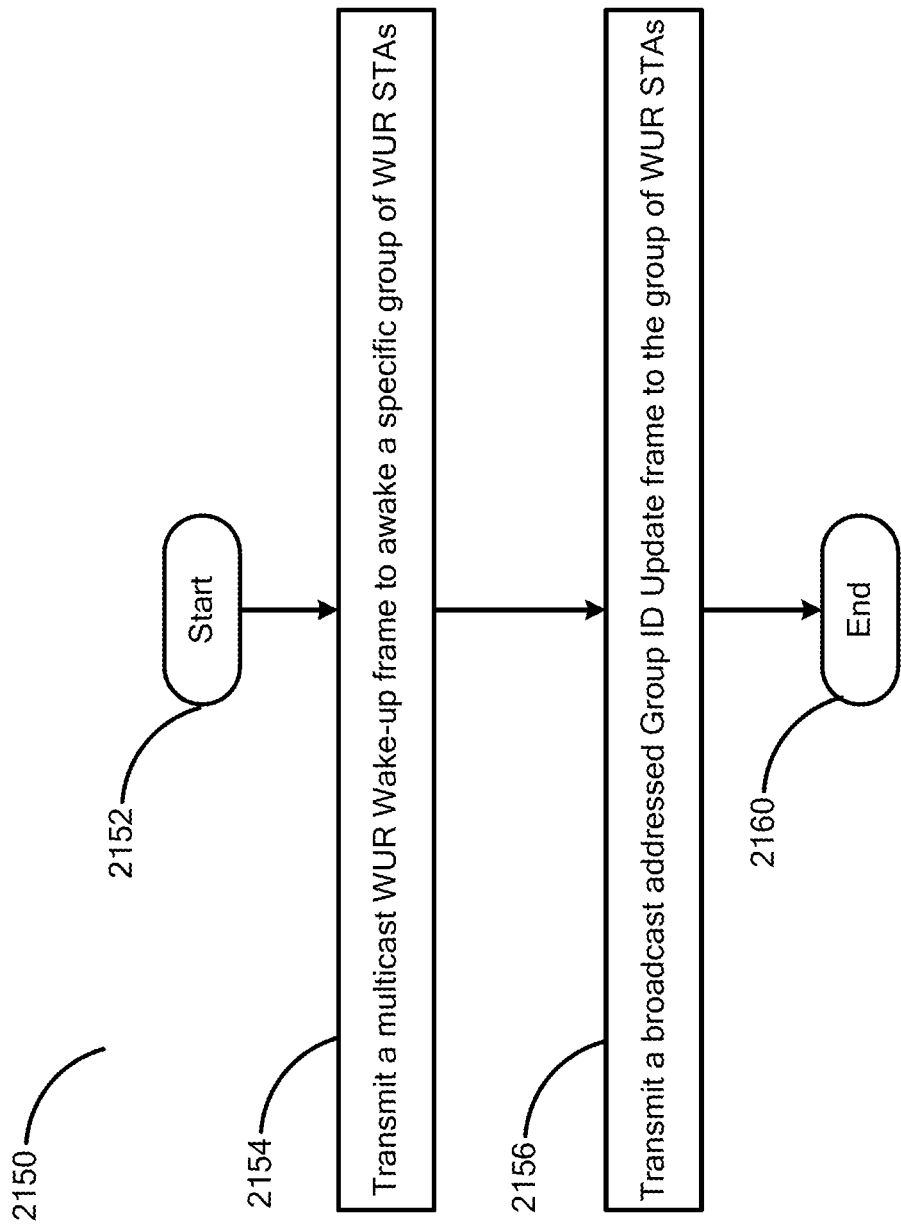
FIG. 21B is a flowchart illustrating a second example group ID update procedure according to the present disclosure.

FIG. 21B illustrates a second example Group ID update procedure 2150 according to the present disclosure. The procedure 2150 starts at step 2152. At step 2154, the AP 110 transmits a multicast WUR Wake-up frame to a group of WUR STAs in WUR Mode. After receiving the multicast WUR Wake-up frame by its WURx, the PCR of each WUR STA in WUR Mode belonging to the group transits to the awake state. At step 2156, the AP 110 transmits a broadcast addressed Group ID Update frame to update the Group ID of the group. After receiving the broadcast addressed Group ID Update frame by its PCR, each WUR STA belonging to the group stores the updated Group ID for the group. The procedure 2150 stops at step 2160.

Figure 22:
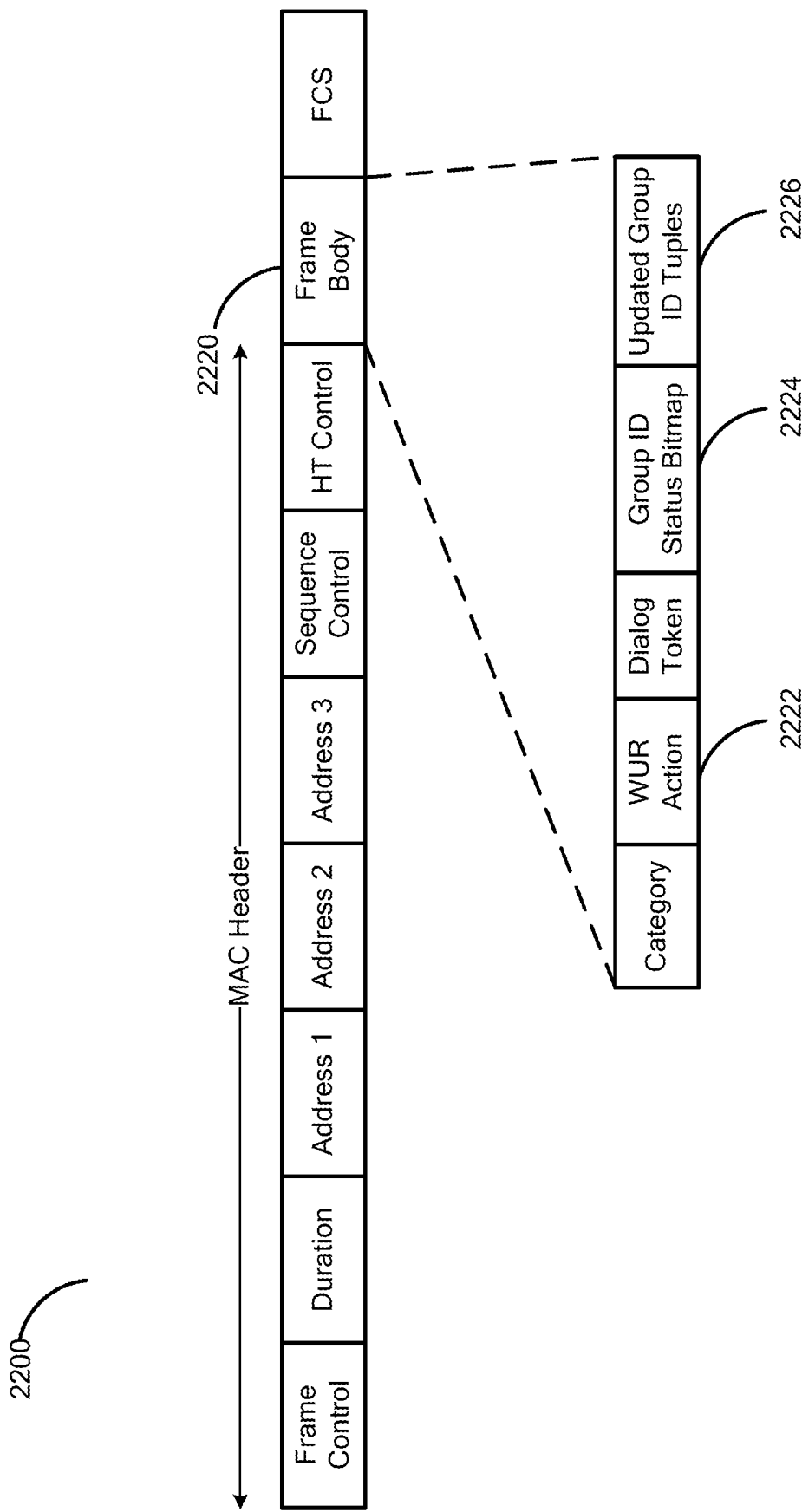
FIG. 22 is a diagram illustrating an example format of the Group ID Update frame according to the present disclosure.

FIG. 22 illustrates an example format of the Group ID Update frame 2200 according to the present disclosure. The Group ID Update frame 2200 is a WUR Action frame with the WUR Action field 2222 set to "Group ID Update". The Frame Body field 2220 of the Group ID Update frame 2200 comprises a Group ID Status Bitmap field 2224 and an Updated Group ID Tuples field 2226. When bit Y of the Group ID Status Bitmap field 2224 is set to 1 where Y=0, 1, . . . , L−1 and L is the size of the Group ID Status Bitmap field 2224, the group with Group ID equal to the smallest Group ID that can be provided by the AP 110 plus Y has a new Group ID. Otherwise the group with Group ID equal to Y has its Group ID unchanged. The Updated Group ID Tuples field 2226 comprises one or more Updated Group ID subfields, each containing a new Group ID for a group whose Group ID has changed.

(An Example Format of WUR PPDU)

Figure 23:
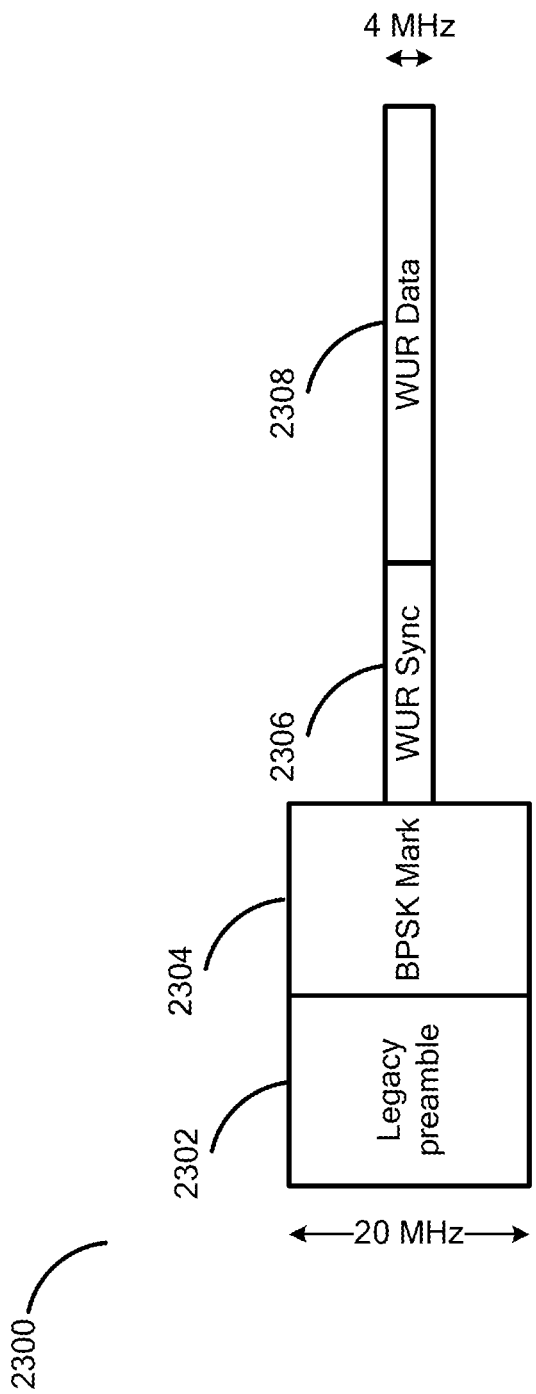
FIG. 23 is a diagram illustrating an example format of WUR PPDU (Physical Layer Protocol Data Unit) according to the present disclosure.

FIG. 23 illustrates an example format of WUR PPDU 2300 according to the present disclosure. The WUR PPDU 2300 comprises a legacy preamble 2302, a BPSK (binary phase shift keying) Mark field 2304, a WUR Sync field 2306 and a WUR Data field 2308. The legacy preamble 2302 and the BPSK Mark field 2304 are transmitted with 20 MHz bandwidth while the WUR Sync field 2306 and the WUR Data field 2308 are transmitted with a much narrower bandwidth (e.g., 4 MHz). The legacy preamble 2302 and the BPSK Mark field 2304 assist third party STAs in avoiding unnecessary channel access collision. The WUR Sync field 2306 aims to be used by WURx to perform time synchronization and packet detection. The WUR Sync field 2306 is also used to indicate the data rate of the WUR Data field 2308. The WUR Data field 2308 contains a WUR frame (e.g., WUR Beacon frame or WUR Wake-up frame).

(Configuration of a WUR Apparatus)

Figure 24A:
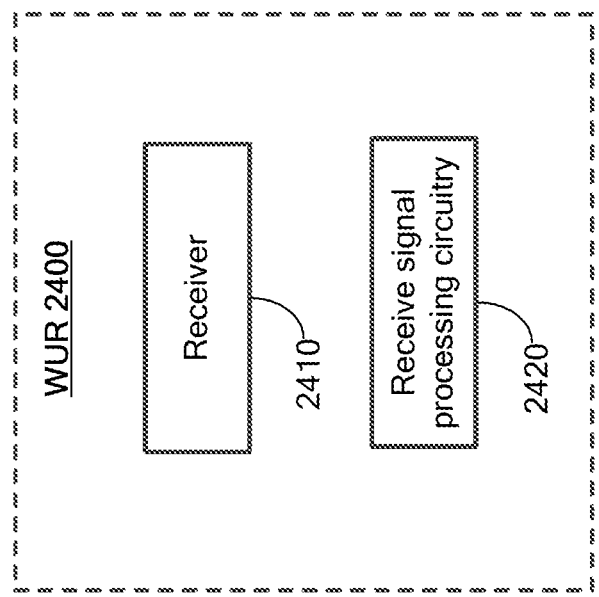
FIG. 24A is a simple block diagram of an example WUR according to the present disclosure.

FIG. 24A is a simple block diagram of an example WUR 2400. The WUR 2400 may be the WUR 134 in the STA 130 or the WUR 144 in the STA 140 as illustrated in FIG. 1. The WUR 2400 comprises a receiver 2410 and a receive signal processing circuitry 2420. The receiver 2410 is responsible for reception of WUR signal, and the receive signal processing circuitry 2420 is responsible for processing the received WUR signal.

Figure 24B:
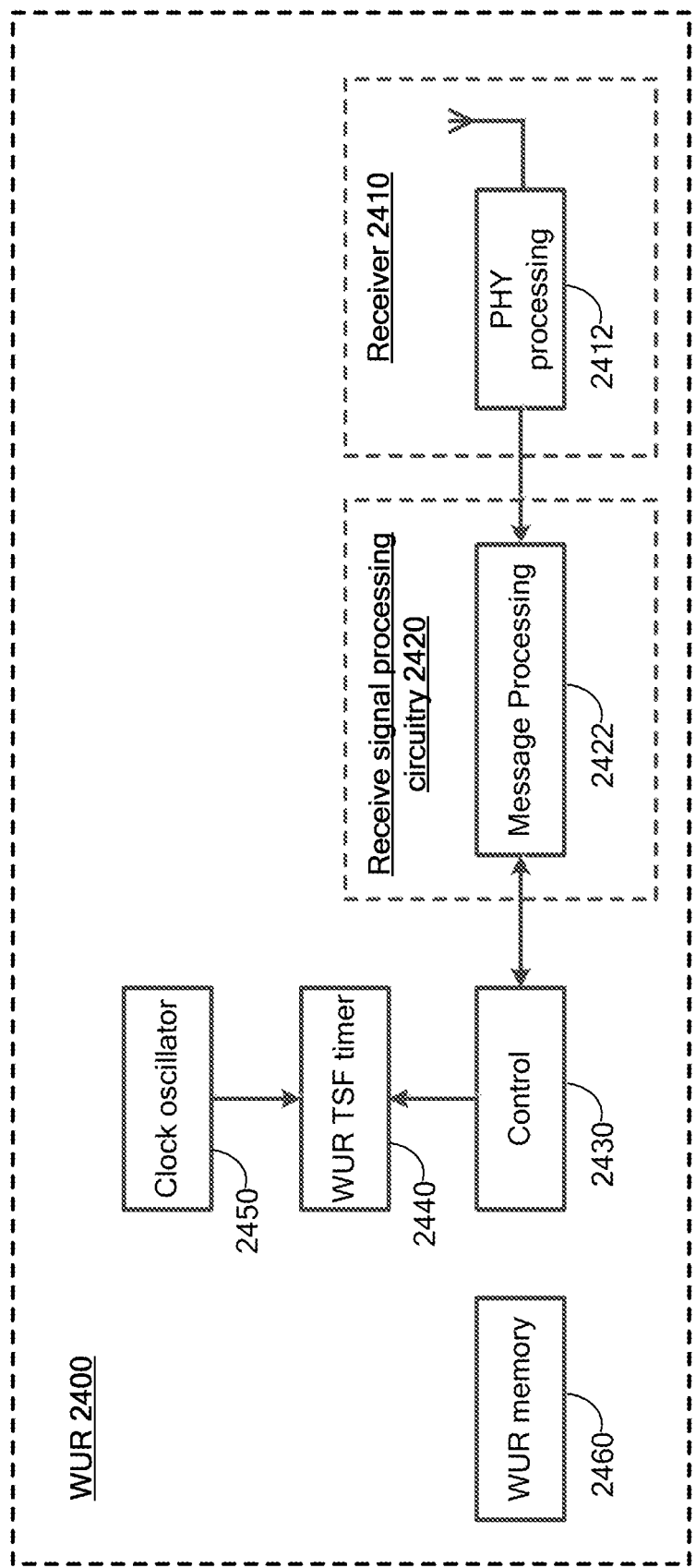
FIG. 24B is a detailed block diagram of the example WUR according to the present disclosure.

FIG. 24B is a detailed block diagram of the example WUR 2400. The WUR 2400 further comprises a control circuitry 2430, a WUR memory 2460, and a WUR TSF timer 2440 which is drived by a clock oscillator 2450. The control circuitry 2430 is used to control general MAC protocol operations. In particular, the control circuitry 2430 is used to set the WUR TSF timer 2440 according to received partial TSF. The receiver 2410 of the WUR 2400 comprises a PHY processing circuitry 2412, which is responsible for converting WUR PPDUs received through antennas into WUR frames. The receive signal processing circuitry 2420 of the WUR 2400 comprises a message processing circuitry 2422, which is responsible for processing the received WUR frames under the control of the control circuitry 2430 and passing the corresponding WUR frame information to the control circuitry 2430. For example, the message processing circuitry 2422 is used to extract the partial TSF from each of the received WUR Beacon frames. The received WUR frames are configured according to the various embodiments of the present disclosure. The WUR memory 2460 is responsible for storing the WUR parameters (e.g., group ID information) negotiated between the WUR STA (e.g., 130 or 140) containing the WUR 2400 and the AP 110, especially when the WUR STA operates in WUR Mode Suspend.

The WUR 2400 may comprise many other components that are not illustrated, for sake of clarity, in FIG. 24A and FIG. 24B. Only those components that are most pertinent to the present disclosure are illustrated.

(Configuration of a PCR Apparatus)

Figure 25A:
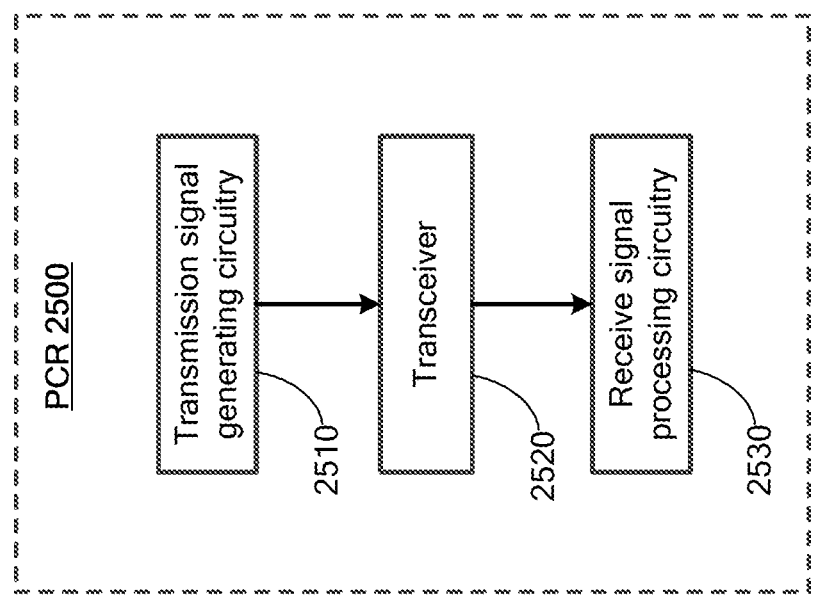
FIG. 25A is a simple block diagram of an example PCR according to the present disclosure.

FIG. 25A is a simple block diagram of an example PCR 2500 which is capable for transmitting and receiving standard IEEE 802.11 signal. The PCR 2500 may be the PCR 112 in the AP 110, the PCR 132 in the STA 130 or the PCR 142 in the STA 140 as illustrated in FIG. 1. In particular, the PCR 112 in the AP 110 is also capable for transmitting WUR signal. The PCR 2500 comprises a transmission signal generating circuitry 2510, a transceiver 2520 and a receive signal processing circuitry 2530. The transmission signal generating circuitry 2510 is responsible for generating standard IEEE 802.11 signal and WUR signal if applicable, the transceiver 2520 is responsible for transmitting the generated standard IEEE 802.11 signal and WUR signal if applicable as well as receiving the standard IEEE 802.11 signal, and the receive signal processing circuitry 2530 is responsible for processing the received standard IEEE 802.11 signal.

Figure 25B:
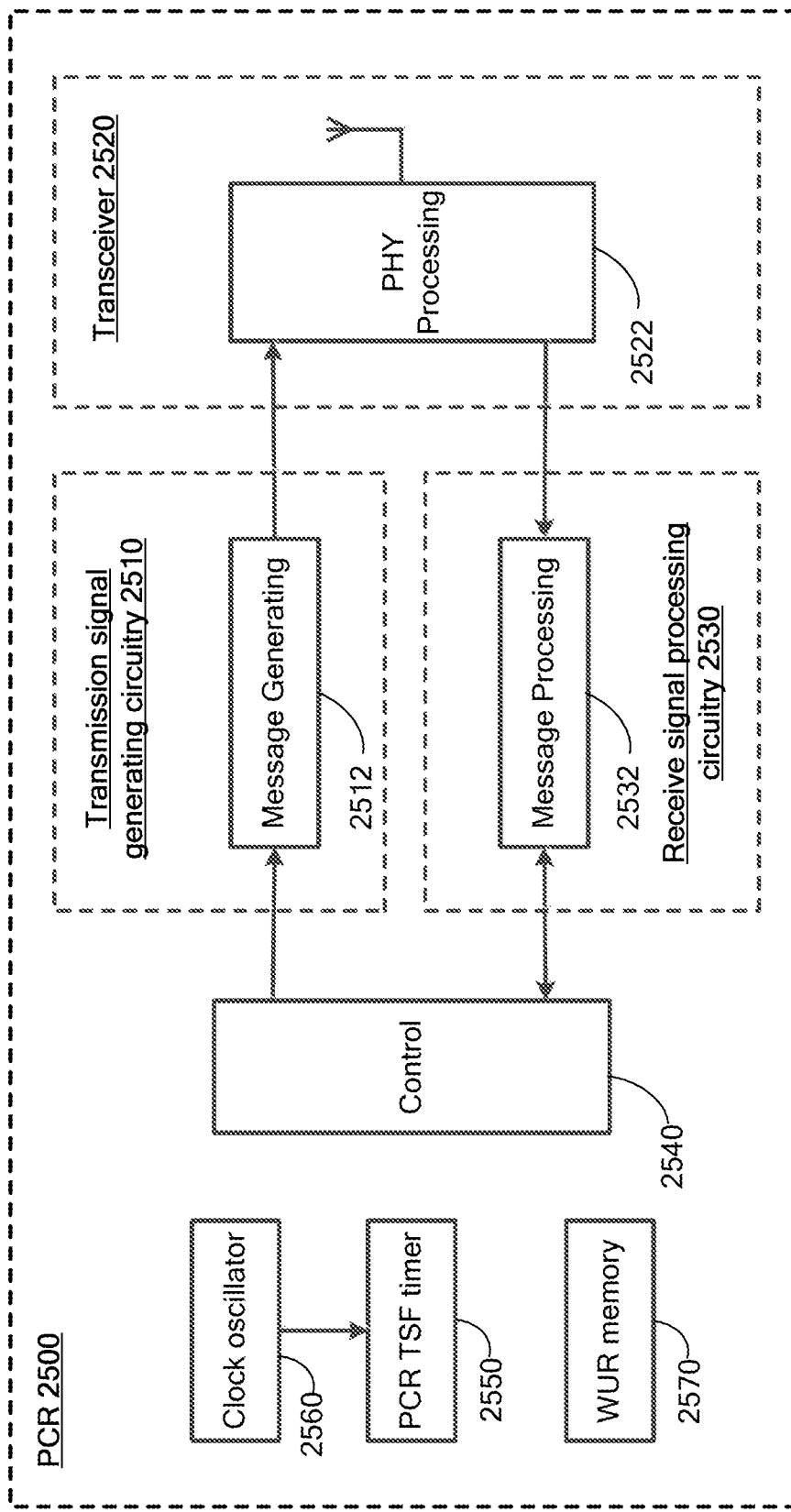
FIG. 25B is a detailed block diagram of the example PCR according to the present disclosure.

FIG. 25B is a detailed block diagram of the example PCR 2500. The PCR 2500 further comprises a control circuitry 2540 and a PCR TSF timer 2550 which is drived by a clock oscillator 2560. The control circuitry 2540 is used to control general MAC protocol operation. The transmission signal generating circuitry 2510 comprises a message generating circuitry 2512, which is responsible for generating MAC frames (e.g., Beacon frame, Probe Request/Response frame, Association Request/Response frame, WUR Action frame and WUR frame) under the control of the control circuitry 2540 according to various embodiments of the present disclosure. The transceiver 2520 comprises a PHY processing circuitry 2522, which is responsible for formulating the generated MAC frames into PPDUs including WUR PPDUs and transmitting them through antennas as well as converting PPDUs excluding WUR PPDUs received through the antennas into MAC frames. The receive signal processing circuitry 2530 comprises a message processing circuitry 2532, which is responsible for processing the received MAC frames (e.g., parsing MAC Header, etc.) under the control of the control circuitry 2540 and passing the corresponding MAC information to the control circuitry 2540.

According to the present disclosure, when the PCR 2500 is used in the AP 110, it further comprises a WUR memory 2570, which is responsible for storing the WUR parameters negotiated between the WUR STAs (e.g., 130 and 140) and the AP 110, especially when the WUR STAs operate in WUR Mode Suspend.

The PCR 2500 may comprise many other components that are not illustrated, for sake of clarity, in FIG. 25A and FIG. 25B. Only those components that are most pertinent to the present disclosure are illustrated.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing, as a result of the advancement of semiconductor technology or other derivative technology.

Should a circuit integration technology replacing LSI appear as a result of advancements in semiconductor technology or other technologies derived from the technology, the functional blocks could be integrated using the future integrated circuit technology. Another possibility is the application of biotechnology and/or the like.

The disclosure of Japanese Patent Application No. 2018-078232, filed on Apr. 16, 2018, including the specification, drawings and abstract, is incorporated herein by reference in its entirety.

INDUSTRIAL APPLICABILITY

This disclosure can be applied to an apparatus and a method for WUR mode operation in a wireless network.

REFERENCE SIGNS LIST

110 AP
130, 140 STA
112, 132, 142, 2500 PCR
134, 144, 2400 WUR
2410 Receiver
2412, 2522 PHY processing circuitry
2420, 2530 Receive signal processing circuitry
2422, 2532 Message processing circuitry
2430, 2540 Control circuitry
2440 WUR TSF timer
2450, 2560 Clock oscillator
2510 Transmission signal generating circuitry
2512 Message generating circuitry
2520 Transceiver
2550 PCR TSF timer
2460, 2570 WUR memory

The invention claimed is:

1. A station comprising:
a receiver, which, in operation, receives a signal that includes a data field, the data field including a Wake Up Radio (WUR) Mode Setup frame, wherein a field of a WUR Mode element included in the WUR Mode Setup frame includes information on group identifiers (IDs) assigned by an Access Point (AP) to the station; and
circuitry, which, in operation, decodes the received signal,
wherein the field includes a subfield including a group ID bitmap whose size is equal to a number of group IDs that the AP is configured to provide, and in response to bit Y of the group ID bitmap being set to 1 (Y=0, 1, . . . , L−1, and L is the size of the group ID bitmap), the group ID assigned by the AP to the station is equal to a smallest group ID, that the AP is configured to provide, plus Y.

2. The station according to claim 1, wherein the circuitry interprets that the received signal is addressed to the station based on the information on the group IDs and the group ID bitmap.

3. The station according to claim 1, wherein responsive to a WUR wake-up frame including the group ID being received by the receiver, the circuitry performs a wake-up operation.

4. The station according to claim 1, wherein the smallest group ID that the AP is configured to provide is indicated in another subfield included in the field.

5. The station according to claim 1, wherein the smallest group ID that the AP is configured to provide is indicated in a WUR Operation element most recently received by the station.

6. The station according to claim 1, wherein the field includes a first subfield including a first group ID bitmap whose size is not larger than the group ID bitmap size which the AP is capable of storing and in response to bit Y of the first group ID bitmap being set to 1 (Y=0, 1, . . . , L−1 and L is the size of the first group ID bitmap), the group ID assigned by the AP to the station is equal to the group ID corresponding to bit 0 of the first group ID bitmap plus Y.

7. The station according to claim 6, wherein the group ID corresponding to bit 0 of the first group ID bitmap is indicted in a second subfield of the field and is selected in such a manner that no group ID indicated in the first group ID bitmap is out of group ID value range.

8. The station according to claim 6, wherein the size of the first group ID bitmap is indicated in a third subfield of the field.

9. The station according to claim 6, wherein the group IDs assigned by the AP to the station which are not indicated in the first group ID bitmap are indicated in a fourth subfield of the field.

10. The station according to claim 1, wherein the field comprises a first subfield including a first group ID bitmap whose size is not larger than the group ID bitmap size which the AP is capable of storing and in response to bit Y of the first group ID bitmap being set to 1 (Y=0, 1, . . . , L−1 and L is the size of the first group ID bitmap), the group ID assigned by the AP to the station is equal to the group ID corresponding to bit 0 of the first group ID bitmap plus Y minus the number of group IDs that is provided by the AP if the group ID corresponding to bit 0 of the first group ID bitmap plus Y is larger than a largest group ID that the AP is configured to provide, otherwise the group ID assigned by the AP to the station is equal to the group ID corresponding to bit 0 of the first group ID bitmap plus Y.

11. The station according to claim 10, wherein the group ID corresponding to bit 0 of the first group ID bitmap is indicated in a second subfield of the field.

12. The station according to claim 10, wherein the size of the first group ID bitmap is indicated in a third subfield of the field.

13. The station according to claim 10, wherein the group IDs assigned by the AP to the station which are not indicated in the first group ID bitmap are indicated in a fourth subfield of the field.

14. The station according to claim 10, wherein the largest group ID that the AP is configured to provide is indicted in a fifth subfield of the field.

15. The station according to claim 10, wherein the largest Group ID that the AP is configured to provide is indicted in a WUR Operation element most recently received by the station.

16. A communication method implemented by a station, the communication method comprising:
receiving a signal that includes a data field, the data field including a Wake Up Radio (WUR) Mode Setup frame, wherein a field of a WUR Mode element included in the WUR Mode Setup frame includes information on group identifiers (IDs) assigned by an Access Point (AP) to the station; and
decoding the received signal,
wherein the field includes a subfield including a group ID bitmap whose size is equal to a number of group IDs that the AP is configured to provide, and in response to bit Y of the group ID bitmap being set to 1 (Y=0, 1, . . . , L−1, and L is the size of the group ID bitmap), the group ID assigned by the AP to the station is equal to a smallest group ID, that the AP is configured to provide, plus Y.

17. An Access Point (AP) comprising:
circuitry, which, in operation, generates a signal that includes a data field, the data field including a Wake Up Radio (WUR) Mode Setup frame, wherein a field of a WUR Mode element included in the WUR Mode Setup frame includes information on group identifiers (IDs) assigned by the AP to a group of stations; and
a transmitter, which, in operation, transmits the generated signal, wherein the field includes a subfield including a group ID bitmap whose size is equal to a number of group IDs that the AP is configured to provide, and in response to bit Y of the group ID bitmap being set to 1 (Y=0, 1, ..., L−1, and L is the size of the group ID bitmap), the group ID assigned by the AP to the group of stations is equal to a smallest group ID, that the AP is configured to provide, plus Y.

\* \* \* \* \*